(12) United States Patent
Yamada et al.

(10) Patent No.: US 11,818,319 B2
(45) Date of Patent: Nov. 14, 2023

(54) INFORMATION PROCESSING APPARATUS, IMAGE PROCESSING METHOD, AND MEDIUM

(71) Applicant: CANON KABUSHIKI KAISHA, Tokyo (JP)

(72) Inventors: Akitoshi Yamada, Kanagawa (JP); Kentaro Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/688,993

(22) Filed: Mar. 8, 2022

(65) Prior Publication Data
US 2022/0294931 A1 Sep. 15, 2022

(30) Foreign Application Priority Data

Mar. 11, 2021 (JP) .................. 2021-039527

(51) Int. Cl.
*H04N 1/58* (2006.01)
*H04N 1/60* (2006.01)
*H04N 1/64* (2006.01)

(52) U.S. Cl.
CPC ............. *H04N 1/58* (2013.01); *H04N 1/6066* (2013.01); *H04N 1/648* (2013.01)

(58) Field of Classification Search
CPC ......... H04N 1/648; H04N 1/58; H04N 1/6066
See application file for complete search history.

(56) References Cited

U.S. PATENT DOCUMENTS

| | | | |
|---|---|---|---|
| 5,883,984 A * | 3/1999 | Huang | G06T 5/20 382/274 |
| 6,191,874 B1 | 2/2001 | Yamada et al. | |
| 6,424,752 B1 | 7/2002 | Katayama et al. | |
| 6,549,681 B1 | 4/2003 | Takiguchi et al. | |
| 6,608,926 B1 * | 8/2003 | Suwa | H04N 1/4074 358/522 |
| 6,621,921 B1 | 9/2003 | Matsugu et al. | |
| 6,694,051 B1 * | 2/2004 | Yamazoe | G06T 5/009 358/1.9 |
| 6,704,041 B2 | 3/2004 | Katayama et al. | |
| 7,847,958 B2 * | 12/2010 | Ishikura | H04N 1/00875 358/1.14 |

(Continued)

FOREIGN PATENT DOCUMENTS

| | | | | |
|---|---|---|---|---|
| CA | 2 422 412 A | | 4/2002 | |
| CA | 2384485 C | * | 2/2010 | .......... B41J 2/04528 |

(Continued)

OTHER PUBLICATIONS

Co-pending U.S. Appl. No. 17/688,988, filed Mar. 8, 2022.
Co-pending U.S. Appl. No. 17/688,938, filed Mar. 8, 2022.

*Primary Examiner* — Ted W Barnes
(74) *Attorney, Agent, or Firm* — Venable LLP

(57) ABSTRACT

An information processing apparatus connected to an image forming unit and a reading unit is provided. The apparatus generates image data based on document data described in a page description language, encodes the document data to be multiplexed on the image data, outputs the image data to the image forming unit, restores the multiplexed document data from the image data read by the reading unit, and saves the image data read by the reading unit and the document data restored by a restoration unit.

19 Claims, 12 Drawing Sheets

(56) References Cited

U.S. PATENT DOCUMENTS

| | | | |
|---|---|---|---|
| 7,924,469 B2 | 4/2011 | Ono et al. | |
| 7,944,588 B2 * | 5/2011 | Yamada | G06K 15/02 358/1.9 |
| 8,102,558 B2 | 1/2012 | Goto et al. | |
| 8,175,155 B2 | 5/2012 | Suwa et al. | |
| 8,199,339 B2 * | 6/2012 | Ihara | G06F 21/608 358/1.14 |
| 8,237,991 B2 | 8/2012 | Ono et al. | |
| 8,295,598 B2 * | 10/2012 | Inoue | G09G 5/393 382/173 |
| 8,300,925 B2 * | 10/2012 | Kunieda | G06T 1/0028 382/209 |
| 8,405,876 B2 | 3/2013 | Nakatani et al. | |
| 9,019,518 B2 | 4/2015 | Takayama | |
| 2002/0191229 A1 | 12/2002 | Tamamura | |
| 2003/0059085 A1 * | 3/2003 | Miyake | G06T 1/0071 382/232 |
| 2003/0063319 A1 * | 4/2003 | Umeda | H04N 1/32352 358/1.14 |
| 2003/0138143 A1 * | 7/2003 | Noguchi | G06T 5/007 382/167 |
| 2004/0120544 A1 * | 6/2004 | Eguchi | G06T 1/0078 382/100 |
| 2007/0147657 A1 * | 6/2007 | Sato | H04N 1/32154 382/100 |
| 2008/0062483 A1 * | 3/2008 | Morimoto | H04N 1/56 358/530 |
| 2008/0218806 A1 * | 9/2008 | Yokokura | H04N 1/32144 358/3.28 |
| 2009/0086242 A1 * | 4/2009 | Kato | H04N 1/60 358/1.13 |
| 2009/0110313 A1 * | 4/2009 | Sakaue | H04N 1/41 382/243 |
| 2009/0210715 A1 * | 8/2009 | Izu | G06F 21/64 713/176 |
| 2011/0304861 A1 * | 12/2011 | Monga | H04N 1/6033 358/1.9 |
| 2012/0162677 A1 * | 6/2012 | Kato | H04N 1/40 358/1.9 |
| 2012/0229867 A1 * | 9/2012 | Takagi | H04N 1/32325 358/3.28 |
| 2012/0268759 A1 | 10/2012 | Ono et al. | |
| 2013/0050764 A1 * | 2/2013 | Zhan | H04N 1/403 382/176 |
| 2013/0293913 A1 * | 11/2013 | Takayama | H04N 1/00063 358/1.13 |
| 2017/0099410 A1 * | 4/2017 | Iguchi | H04N 1/32229 |
| 2017/0214829 A1 * | 7/2017 | Nakabayashi | H04N 1/00846 |
| 2019/0005601 A1 * | 1/2019 | Ishida | H04N 1/54 |
| 2021/0042487 A1 * | 2/2021 | Benito Altamirano | H04N 1/32144 |

FOREIGN PATENT DOCUMENTS

| | | | | |
|---|---|---|---|---|
| JP | 2002142128 A | * | 5/2002 | H04N 1/62 |
| JP | 2007043423 A | * | 2/2007 | |
| JP | 2008-186165 A | | 8/2008 | |
| JP | 4187749 B2 | * | 11/2008 | G06T 1/0042 |
| JP | 4187749 B2 | | 11/2008 | |
| JP | 5180551 B2 | * | 4/2013 | H04N 1/32144 |
| JP | 5180551 B2 | | 4/2013 | |
| JP | 2021027434 A | * | 2/2021 | |

* cited by examiner

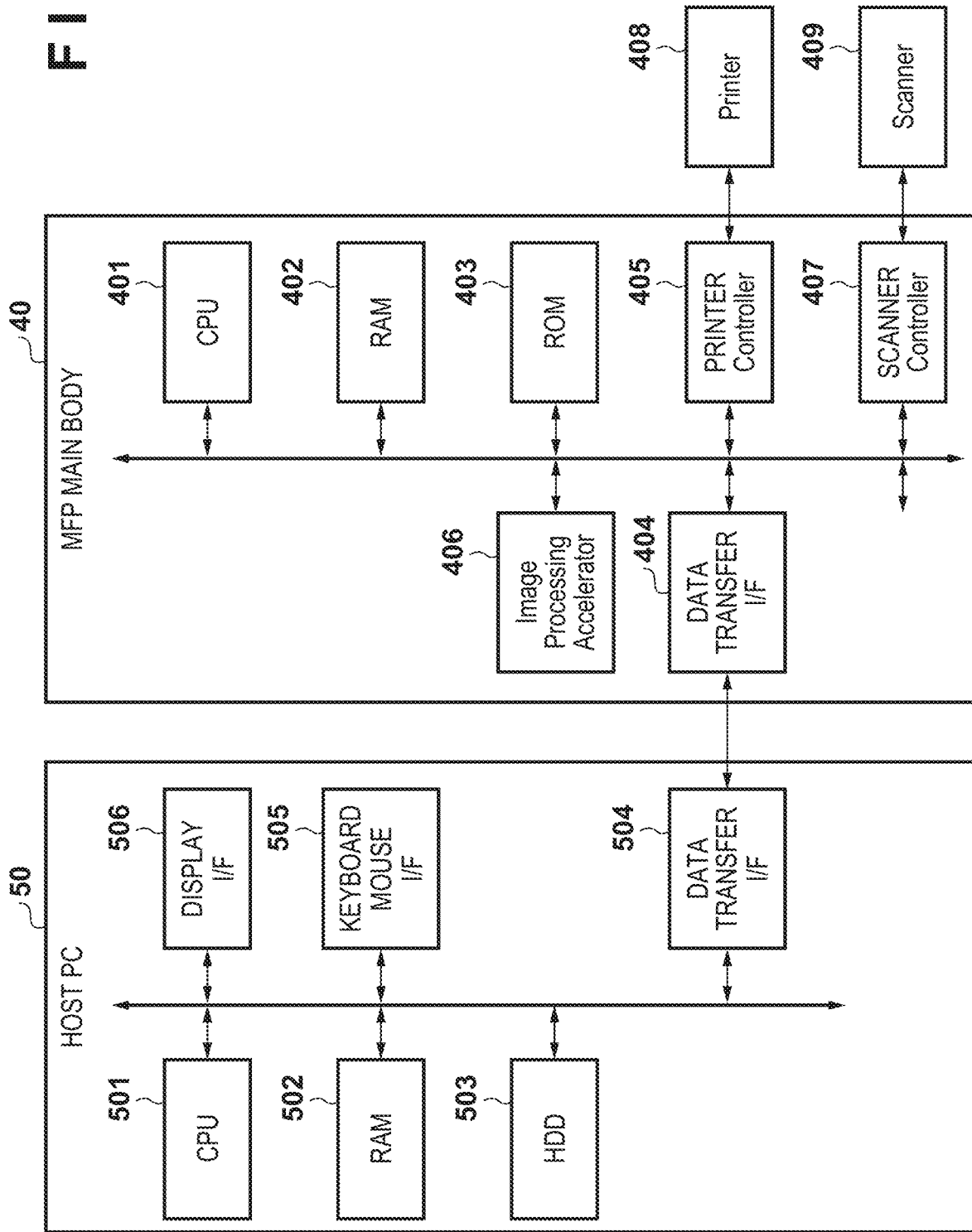

FIG. 5A
| 10  | 0   | 0   | -10 | -10 | 0   | 0   | 10  |
|-----|-----|-----|-----|-----|-----|-----|-----|
| 0   | 0   | -10 | -10 | 0   | 0   | 10  | 10  |
| 0   | -10 | -10 | 0   | 0   | 10  | 10  | 0   |
| -10 | -10 | 0   | 0   | 10  | 10  | 0   | 0   |
| -10 | 0   | 0   | 10  | 10  | 0   | 0   | -10 |
| 0   | 0   | 10  | 10  | 0   | 0   | -10 | -10 |
| 0   | 10  | 10  | 0   | 0   | -10 | -10 | 0   |
| 10  | 10  | 0   | 0   | -10 | -10 | 0   | 0   |
FIG. 5B
| 10  | 0   | 0   | -10 | -10 | 0   | 0   | 10  |
|-----|-----|-----|-----|-----|-----|-----|-----|
| 10  | 10  | 0   | 0   | -10 | -10 | 0   | 0   |
| 0   | 10  | 10  | 0   | 0   | -10 | -10 | 0   |
| 0   | 0   | 10  | 10  | 0   | 0   | -10 | -10 |
| -10 | 0   | 0   | 10  | 10  | 0   | 0   | -10 |
| -10 | -10 | 0   | 0   | 10  | 10  | 0   | 0   |
| 0   | -10 | -10 | 0   | 0   | 10  | 10  | 0   |
| 0   | 0   | -10 | -10 | 0   | 0   | 10  | 10  |
FIG. 6A
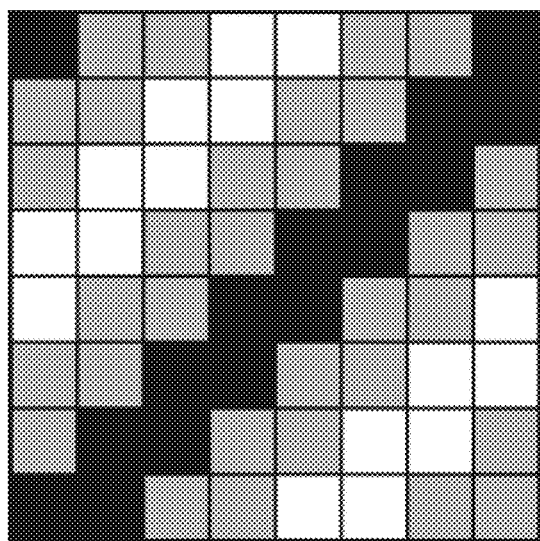
FIG. 6B
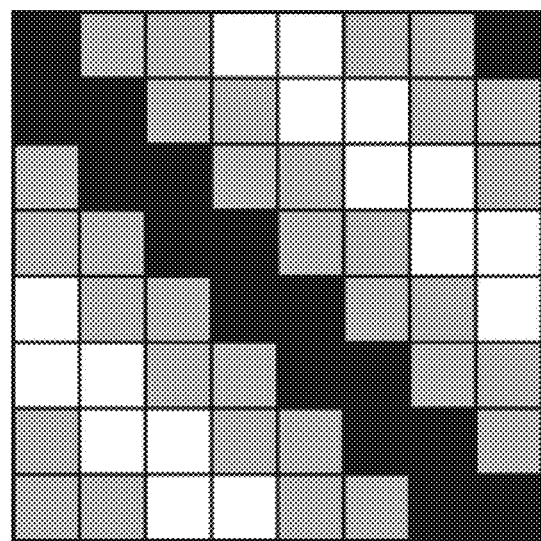

MULTIPLEXING PDL DOCUMENT

INFORMATION PROCESSING APPARATUS, IMAGE PROCESSING METHOD, AND MEDIUM

BACKGROUND OF THE INVENTION

Field of the Invention

The present invention relates to, for example, an information processing apparatus, an image processing method, and a medium.

Description of the Related Art

Conventionally, there is known a scan function of reading, by a scanner, an output image obtained by printing a digital document by a printer, and saving the read digital document. At this time, it is known that the read digital document generated by performing a printing step and a scan step deteriorates in color and shape from the original digital document.

To cope with this, Japanese Patent No. 5180551 describes an example in which output image color is estimated in consideration of the output characteristics of a printer in addition to color information in a digital document, the estimated color is embedded as multiplexed information in a printed image, and the multiplexed information is extracted from a scanned image to restore color deterioration.

However, in Japanese Patent No. 5180551, color deterioration occurring in a printing step and a scan step, or caused by addition of data to the print document, a stain, or the like can be restored so as to become close to the state before deterioration but there is a concern about the shape restoration accuracy.

SUMMARY OF THE INVENTION

The present invention suppresses image deterioration in a read digital document, caused by image formation on a medium.

The present invention has the following arrangement. According to an aspect of the present invention, provided is an information processing apparatus connected to an image forming unit configured to form an image based on image data and a reading unit configured to read an image as image data, the information processing apparatus comprising one or more processors and one or more memories comprising one or more programs, wherein the one or more programs are configured to cause the one or more processors to generate image data based on document data described in a page description language, encode the document data to be multiplexed on the image data, output the image data to the image forming unit, restore the multiplexed document data from the image data read by the reading unit, and save the image data read by the reading unit and the document data restored by a restoration unit.

According to another aspect of the present invention, provided is an information processing apparatus connected to an image forming unit configured to form an image based on image data, the information processing apparatus comprising one or more processors and one or more memories comprising one or more programs, wherein the one or more programs are configured to cause the one or more processors to generate image data based on document data described in a page description language, encode the document data to be multiplexed on the image data, and output the image data to the image forming unit.

According to still another aspect of the present invention, provided is an information processing apparatus connected to a reading unit configured to read, as image data, an image on which document data described in a page description language is multiplexed, the information processing apparatus comprising one or more processors and one or more memories comprising one or more programs, wherein the one or more programs are configured to cause the one or more processors to restore the multiplexed document data from the image data read by the reading unit, and save the image data read by the reading unit and the document data restored by a restoration unit.

According to the present invention, it is possible to suppress image deterioration in a read digital document, caused by image formation on a medium.

Further features of the present invention will become apparent from the following description of exemplary embodiments with reference to the attached drawings.

BRIEF DESCRIPTION OF THE DRAWINGS

FIG. 1 is a block diagram of a system configuration;

FIGS. 5A and 5B are views for explaining masks for generating an image variation by PDL multiplexing;

FIGS. 6A and 6B are views for explaining patterns formed by PDL multiplexing;

DESCRIPTION OF THE EMBODIMENTS

Figure 2A:
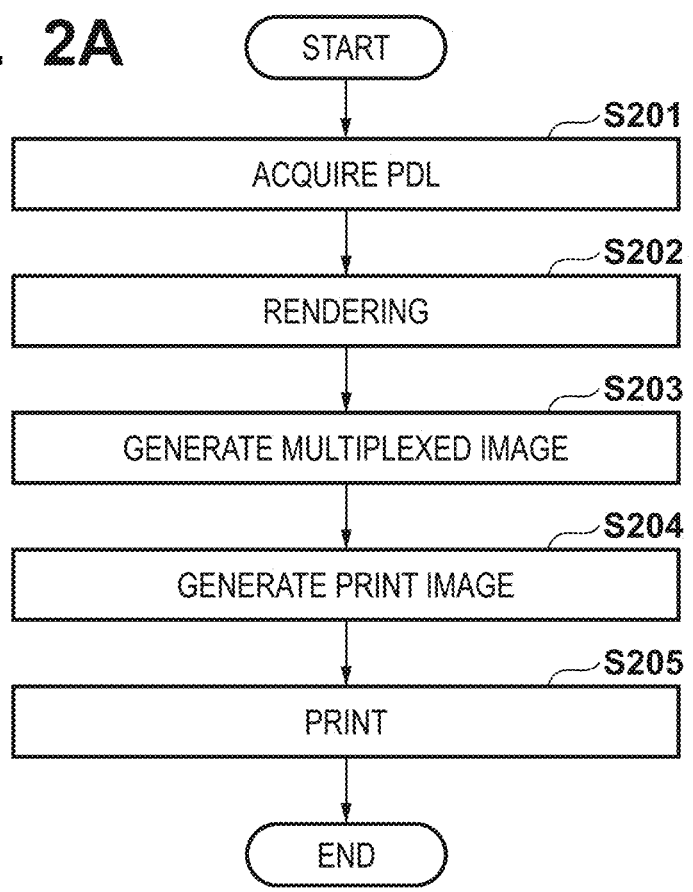
FIGS. 2A and 2B are flowcharts for explaining a PDL multiplexed printing procedure and a multiplexed PDL extraction procedure, respectively, according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the configuration of a printing system according to the present invention. As shown in FIG. 1, a printing apparatus is formed by including an MFP (Multi Function Printer) (multifunction copying machine or a digital multifunction peripheral) main body 40 and a personal computer (PC) 50 as a host apparatus. The MFP main body indicates a printer having, in the main body, a plurality of functions such as a printer function and a scanner function, and often has a copy function implemented by making both the functions cooperate with each other.

The host PC 50 is formed mainly by the following elements. A CPU 501 executes processing according to a program held in an HDD 503 or a RAM 502. The RAM 502 is a volatile storage, and temporarily holds a program and data. The HDD 503 is a nonvolatile storage, and holds a program and data. A data transfer I/F (data transfer interface) 504 controls data transmission/reception to/from the MFP main body 40. As a connection method for the data transmission/reception, wired connection such as USB, IEEE1394, or LAN, or wireless connection such as Bluetooth or WiFi can be used. A keyboard mouse I/F (keyboard mouse interface) 505 is an I/F for controlling an HID (Human Interface Device) such as a keyboard and a mouse, and the user can input data via this I/F. A display I/F (display interface) 506 controls display on a display (not shown).

On the other hand, the MFP main body 40 is formed mainly by the following elements. In accordance with a program held in a ROM 403 or a RAM 402, a CPU 401 executes processing of each of embodiments to be described later with reference to FIG. 3 and subsequent drawings. The RAM 402 is a volatile storage, and temporarily holds a program and data. The ROM 403 is a nonvolatile storage, and can hold table data and a program to be used in the processing of each of the embodiments to be described later with reference to FIG. 3 and the subsequent drawings.

A data transfer I/F (data transfer interface) 404 controls data transmission/reception to/from the PC 50. A printer controller 405 controls a printer unit 408 including a printhead. The printer controller 405 includes a head controller. The head controller controls a heating operation of a heater mounted on a head based on print data with respect to the printhead of the printer unit 408, thereby discharging ink. This forms an image on a medium. More specifically, the head controller can be configured to load control parameters and print data from a predetermined address in the RAM 402. Then, when the CPU 401 writes the control parameters and print data at the predetermined address in the RAM 402, the printer controller 405, more particularly, the head controller activates processing to perform the heating operation of the heater mounted on the printhead.

An image processing accelerator 406 is formed by a hardware component, and executes image processing at a higher speed than the CPU 401. More specifically, the image processing accelerator 406 can be configured to load parameters and data necessary for image processing from a predetermined address in the RAM 402. Then, when the CPU 401 writes the parameters and data at the predetermined address in the RAM 402, the image processing accelerator 406 is activated to perform predetermined image processing. Note that the image processing accelerator 406 is not always required, and may execute the table parameter creation processing and the image processing only in the processing by the CPU 401 in accordance with the specifications of the printer, as a matter of course. A scanner controller 407 instructs a scanner unit 409 to transmit, to the scanner controller 407, light amount information acquired by capturing light irradiation on a document and reflected light by an image sensor such as a CCD. More specifically, when the CPU 401 writes the control parameters and the read data writing address at the predetermined address in the RAM 402, the scanner controller 407 activates processing. Then, light emission control of an LED mounted on the scanner unit 409, acquisition of the light amount information from the scanner unit 409, and write of the light amount information after the read data writing address in the RAM 402 are performed.

The printer controller 405 further includes a motor controller. The motor controller controls a motor operation with respect to a plurality of motor units (not shown) included in the printer unit 408. The motor is used to relatively move the above-described printhead with respect to a print sheet, and to relatively move the scanner unit 409 with respect to a read document. In addition, some MFPs may include a motor for maintenance of the printhead.

Multiplexing Processing of Pixel Count Information for Each Color

Figure 2B:
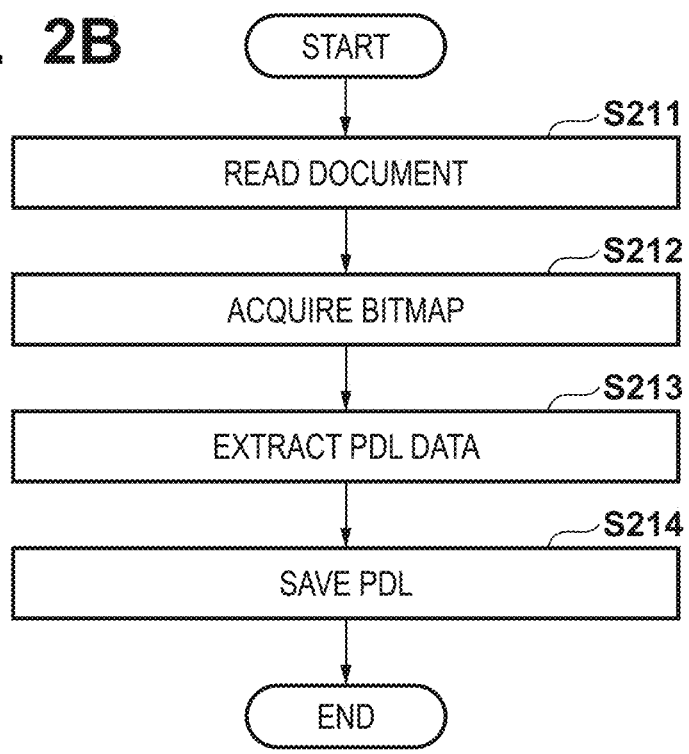

FIGS. 2A and 2B are flowcharts for explaining a PDL multiplexed printing procedure and a multiplexed PDL extraction procedure, respectively, according to the first embodiment. Steps S201 to S205 of FIG. 2A correspond to a procedure (to also be simply referred to as multiplexed printing processing hereinafter) of multiplexing PDL data and executing printing, and steps S211 to S214 of FIG. 2B correspond to a procedure (to also be simply referred to as extraction processing hereinafter) of extracting the multiplexed PDL data. Both the processes are implemented when the CPU 401 of the MFP main body 40 executes the program stored in the memory such as the RAM 402. However, a printing operation in step S205 of FIG. 2A and a document read operation in step S211 of FIG. 2B may be executed by the MFP main body 40 and the remaining steps may be executed by the PC 50. The same applies to other embodiments. The PDL multiplexed printing procedure shown in FIG. 2A will first be described.

In step S201, PDL document data is acquired. PDL is an abbreviation for Page Description Language, and is formed by a set of drawing commands on a page basis. The types of drawing commands are defined for each PDL specification. In this embodiment, the following five types are mainly used as examples. Values in brackets are parameters of a command, and X and Y represent the coordinates of a drawing position.

Command 1) DOT drawing command (X, Y, color, point size)
Command 2) LINE drawing command (X1, Y1, X2, Y2, color, line type, line width)
Command 3) BOX drawing command (X1, Y1, X2, Y2, color, painting shape)
Command 4) TEXT drawing command (X1, Y1, color, font information, character string information)
Command 5) IMAGE drawing command (X1, Y1, X2, Y2, image file information)

In addition, drawing commands such as a CIRCLE drawing command for drawing a circle are appropriately used in accordance with the application purpose.

As PDL generally used, there are provided PDF (Portable Document Format) proposed by Adobe, XPS proposed by Microsoft, and HP-GL/2 proposed by HP. The application range of the present invention is not limited to them.

Example of Page Description Language

Figure 3:
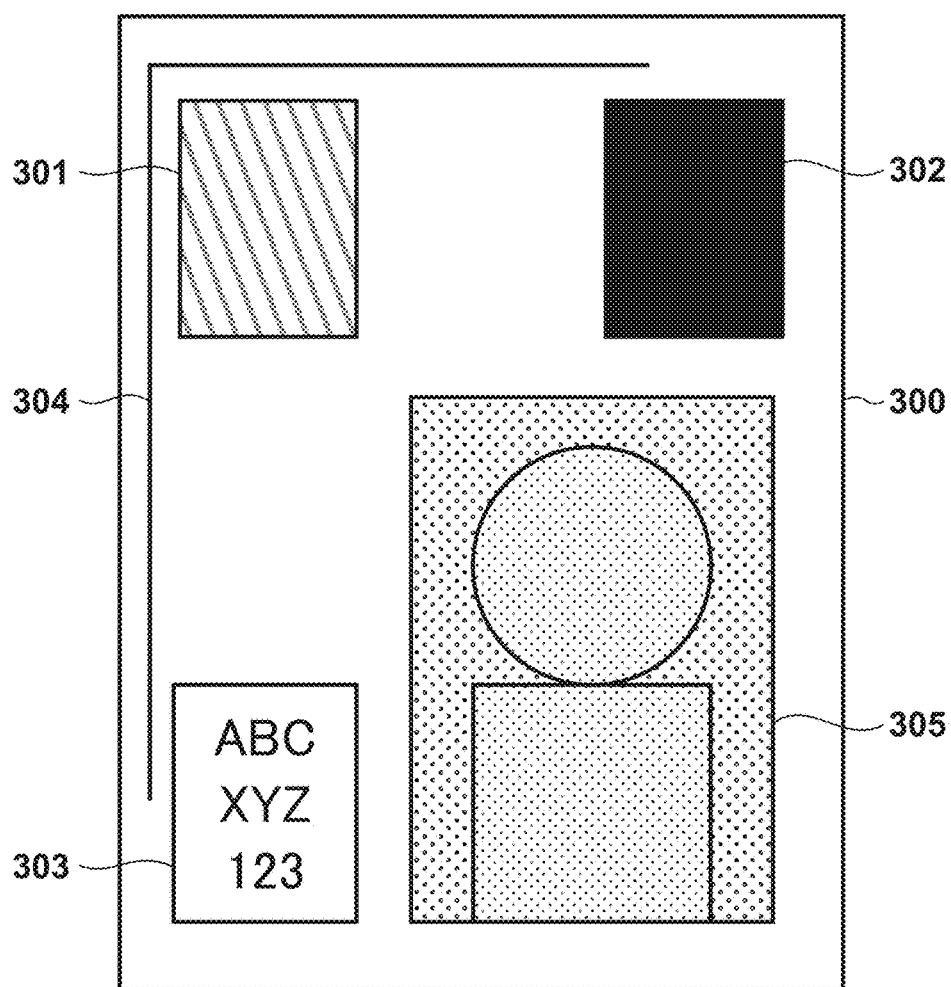
FIG. 3 is a view for explaining an example of a PDL document.

FIG. 3 shows an example of a PDL document. Referring to FIG. 3, reference numeral 300 denotes one page of a document, which has, for example, a width of 600 pixels and a height of 900 pixels as a pixel count. An example of PDL data corresponding to the document shown in FIG. 3 will be described below. Note that a PDL document is data described in PDL, and is also called document data or print data.

```
<PAGE=001>
    <BOX> 50, 75, 200, 300, GRAY, STRIPE </BOX>
    <BOX> 420, 75, 550, 300, BLACK, FULL </BOX>
    <BOX> 50,620, 200, 825, BLACK, NULL </BOX>
<TEXT> 50,620, 200, 825, BLACK, STD-18, "ABCXYZ123" </BOX>
    <LINE> 25, 25, 25, 700, BLACK, PLAIN, 3 </LINE>
    <LINE> 25, 25, 450, 25, BLACK, PLAIN, 3 </LINE>
    <IMAGE> 250, 350, 550, 825, "PORTRAIT.jpg" </IMAGE>
</PAGE>
```

<PAGE=001> of the first row is a tag representing a page number according to this embodiment. Since PDL is normally designed to be able to describe a plurality of pages, a tag indicating a page break is described in PDL. In this example, a portion up to the </PAGE> tag of the ninth row represents the first page. In this embodiment, this portion corresponds to the document page 300 shown in FIG. 3. If there exists the second page, <PAGE=002> is described following the above PDL data.

A portion from the <BOX> tag to the </BOX> tag in the second row is a BOX drawing command, and corresponds to a box object 301 shown in FIG. 3. The first two coordinates indicate upper left coordinates (X1, Y1) as a drawing start point, and the following two coordinates indicate lower right coordinates (X2, Y2) as a drawing end point. Subsequently, GRAY (gray: R=128, G=128, B=128) is designated as a color, and STRIPE (stripe pattern) as a stripe pattern is designated as a painting shape. In this embodiment, a line in the lower right direction is always set with respect to the direction of the stripe pattern but the angle, cycle, and the like of a line may be designable in the BOX command.

The BOX drawing command of the third row corresponds to a box object 302 shown in FIG. 3. For this command, unlike the second row, BLACK (black: R=0, G=0, B=0) is designated as a color, and FULL (solid) as filling is designated as a painting shape.

The BOX drawing command of the fourth row and the TEXT drawing command of the fifth row correspond to an object 303 shown in FIG. 3. First, a frame around text is described by the BOX drawing command. In this example, NULL (blank) is designated as a painting shape in the BOX. The TEXT drawing command of the fifth row describes that a character font is "STD" (standard), a font size is 18 points, and a character string to be described is "ABCXYZ123".

Subsequently, the LINE drawing commands of the sixth and seventh rows correspond to a line object 304 shown in FIG. 3. A vertical line is drawn by the LINE drawing command of the sixth row. It is described that the type of the line to be drawn is PLAIN (solid line) and the width of the line to be drawn is 3 pixels. Similarly, a horizontal line is drawn by the LINE drawing command of the seventh row.

Subsequently, the IMAGE drawing command of the eighth row corresponds to an image object 305 shown in FIG. 3. It is described that the file name of an image existing in the region is "PORTRAIT.jpg", which indicates a JPEG file as a widespread image compression format.

Then, the </PAGE> tag of the ninth row indicates the end of drawing of the page.

As an actual PDL file, the "STD" font data and the "PORTRAIT.jpg" image file are often included in addition to the above-described drawing commands. This is because when the font data and the image file are managed separately, it is impossible to form the character and image portions only by the drawing commands, and information is insufficient to form the image shown in FIG. 3.

The PDL data acquired in step S201 of FIG. 2A has been explained.

Subsequently, the process advances to step S202, and rendering processing of the PDL document data acquired in step S201 is performed. This is a step of executing each drawing command described in the PDL data, and forming a bitmap image formed by color information for each pixel. In this embodiment, as described above, the image exemplified in FIG. 3 is formed. Since the document page 300 shown in FIG. 3 is formed with a width of 600 pixels and a height of 900 pixels, the bitmap image generated in this step is formed by 600×900 pixels. Each pixel is represented by 256 tones for R, G, and B components each formed by 8 bits.

In step S203, a multiplexing image is created. In this example, the PDL file data acquired in step S201 is superimposed (or multiplexed) on the rendering image generated in step S202. This is done to make it possible to extract the PDL file data from the image data when scanning the print image, thereby obtaining a unit of restoring deterioration in image shape described with reference to FIGS. 4A and 4B. Note that if the multiplexing target image data is a color image, multiplexing is performed by targeting a specific color component. In this embodiment, for example, color-specific pixel count information (to also be referred to as pixel count information or additional information hereinafter) is multiplexed by targeting a B (blue) component, but another color component may be targeted.

Processing information by an information processing apparatus like a PC means processing binary data. Binary data includes pieces of information of "0" and "1", and has a specific meaning by continuously concatenating the pieces of information of "0" and "1". If, for example, information of "hello" is processed as binary data, "h" corresponds to binary data of "01101000" by exemplifying "Shift JIS" as one of character codes. Similarly, "e" corresponds to binary data of "01100101", "l" corresponds to binary data of "01101100" and "o" corresponds to binary data of "01101111". That is, the characters of "hello" can be expressed by binary data of "0110100001100101011011000110110001101111". Conversely, if binary data of "0110100001100101011011000110110001101111" can be acquired, characters of "hello" can be acquired. Based on this idea, multiplexing can be implemented by embedding data so as to determine "0" or To generate pieces of information of "0" and "1", that is, information to be multiplexed, two masks shown in FIGS. 5A and 5B are considered as an example. Each mask is a mask formed by 8 pixels×8 pixels, and it is possible to give a pattern having a cycle to a region of 8 pixels×8 pixels in an image by adding the contents of the corresponding mask to the image. This pattern represents 0 and 1. FIG. 5A shows the pattern indicating 0, and FIG. 5B shows the pattern indicating 1. A digital image is basically expressed by 8 bits for each color, and assigned with one of values of 0 to 255. Since a value falling outside this range cannot be used as image data, if the calculation result of a pixel value is smaller than 0 or equal to or larger than 256, 0 or 255 is generally assigned to fall within the effective range. In the mask shown in FIG. 5A or 5B, a change of ±10 is given to the pixel value. However, if all the values of the image data in the mask region are 255, the values in the region after adding the mask fall within not a range of 245 to 265 but a range of 245 to 255. In this description, one color is represented by 8 bits but may be represented by another number of bits other than 8 bits, as a matter of course. When processing a digital image, the effective range exists regardless of the number of bits, and a change that makes a value fall outside the range is not applied. As shown in FIG. 5A or 5B, by performing masking processing for the PDL document image using the mask corresponding to 0 or 1, 1-bit information can be multiplexed on a region of 8×8 pixels.

FIGS. 6A and 6B each visually show a pattern to be given to the image by the mask. A position of "10" in the mask shown in FIG. 5A or 5B is expressed by black, a position of "0" is expressed by gray, and a position of "−10" is expressed by white. Thus, an oblique line shown in FIG. 6A or 6B appears in the image. In this way, a code (color component and pixel count) can be multiplexed, on the original image, as a high-frequency component which is difficult to visually recognize. A pseudo code for applying the mask shown in FIG. 5A or 5B to the overall image in correspondence with the code will now be described.

```
01:     int i, j, k, l;
02:     int width = 640, height=480;
03:     unsigned char *data = image data;
04:     int **maskA= mask data;
05:     bool isMaskA = true;
06:     for(j = 0; j < height; j+=8){
07:       for(i = 0; i < width; i+=8){
08:         for(k = 0; k < 8; k++){
09:           for(l = 0; l < 8; l++){
10:             if(isMaskA == true){
11:               data[(i+k)+(j+l)*width] += maskA[k][l];
12:             }
13:           }
14:         }
15:       }
16:     }
```

The above code indicates a procedure of sequentially focusing on an 8×8 region by targeting image data of 640×480 pixels as an example, and adding, if the region is a region to be masked, the value of each pixel of the mask corresponding to each pixel of the region. The region to be masked is designated by isMaskA, and the mask to be applied is designated by maskA. In this way, information can be embedded by multiplexing using the above method. Note that a region where additional information is multiplexed may be referred to as a code region. Using this multiplexing technique, the original PDL data is multiplexed on the image data to be printed. Since the PDL data is a character string, each character is expressed by a binary code, and is multiplexed on the image data using the mask shown in FIG. 5A or 5B. At this time, according to the above-described code, isMaskA is set to true for the region to be multiplexed, and is set to false for other regions. With respect to the region to be multiplexed, the mask shown in FIG. 5A is designated as maskA for the region on which "0" is multiplexed, and the mask shown in FIG. 5B is designated as maskA for the region on which "1" is multiplexed. The pixel count for each color of the image is multiplexed by performing the above operation in, for example, the raster scanning direction of the image. Note that multiplexing may be performed for a specific color.

Subsequently, the process advances to step S204, and print image is generated. In the print image generation operation, an arbitrary known method may be used but this embodiment will describe an example of using the following method. In this example, the following four processes are performed for each pixel of the multiplexed bitmap image generated in step S203 and formed by R, G, and B pixel values.

Color conversion
Ink color separation
Output characteristic conversion
Quantization Color conversion is processing of performing conversion so that RGB information of the multiplexed bitmap image can preferably be printed by the MFP main body 40. The reason for this is that as a color described in a drawing command of PDL, a color value which can preferably be expressed on a display is generally set, and when the value is output intact by a printer, a different color is undesirably output.

More specifically, to calculate a combination of preferred output pixel values (Rout, Gout, and Bout) for a combination of input pixel values (Rin, Gin, and Bin), a three-dimensional lookup table is used for each output color. Ideally, since each of the input values Rin, Gin, and Bin has 256 tones, a table Table1[256][256][256][3] having 16,777, 216 (=256×256×256) combinations of output values in total is prepared to obtain:

Rout = Table1[Rin][Gin][Bin][0]
Gout = Table1[Rin][Gin][Bin][1]
Bout = Table1[Rin][Gin][Bin][2]

Thus, color conversion can be implemented. Furthermore, a known contrivance to decrease a table size may be used. For example, the number of grids of the lookup table is decreased from 256 to, for example, 16, and an output value is decided by interpolating the table values of a plurality of grids.

Ink color separation is processing of converting the output values Rout, Gout, and Bout of the color conversion processing into output values of the respective ink colors of inkjet printing. This embodiment assumes 4-color inkjet printing of cyan, magenta, yellow, and black. There are various implementation methods for this conversion processing. In this embodiment, similar to the color conversion processing, a combination of preferred ink color pixel values (C, M, Y, and K) is calculated for the combination of the output pixel values (Rout, Gout, and Bout). To do this, a three-dimensional lookup table Table2[256][256][256][4] for each output color can be used to obtain:

C = Table2[Rout][Gout][Bout][0]
M = Table2[Rout][Gout][Bout][1]
Y = Table2[Rout][Gout][Bout][2]
K = Table2[Rout][Gout][Bout][3]

Thus, ink color separation can be implemented. Furthermore, a known contrivance to decrease a table size may be used.

Subsequently, in output characteristic conversion, the density of each ink color is converted into a printing dot count rate. More specifically, for example, the density of 256 tones for each color is converted into a dot count rate Cout, Mout, Yout, or Kout of 1,024 tones for each color. To do this, a two-dimensional lookup table Table3 [4] [256] in which a preferred printing dot count rate for the density of each ink color is set is used to obtain:

Cout = Table3[0][C]
Mout = Table3[1][M]
Yout = Table3[2][Y]
Kout = Table3[3][K]

Thus, output characteristic conversion can be implemented. Furthermore, a known contrivance to decrease a table size may be used. For example, the number of grids of the lookup table is decreased from 256 to, for example, 16, and an output value is decided by interpolating the table values of a plurality of grids.

Subsequently, in quantization, the printing dot count rate Cout, Mout, Yout, or Kout of each ink color is converted into ON/OI/F of an actual printing dot of each pixel. As a quantization method, an arbitrary method such as an error diffusion method or a dither method may be used. The dither method is exemplified to obtain:

Cdot = Halftone[Cout][x][y]
Mdot = Halftone[Mout][x][y]
Ydot = Halftone[Yout][x][y]
Kdot = Halftone[Kout][x][y]

Then, by performing comparison with a threshold corresponding to each pixel position, it is possible to implement ON/OI/F of the printing dot of each color. In this example, the occurrence probability of each printing dot is Cout/1023, Mout/1023, Yout/1023, or Kout/1023.

Thus, the print image generation operation in step S203 ends.

Next, in step S205, the print image generated in step S204 is printed. Thus, the PDL document can be printed on a print sheet.

The above processing can print, on a print sheet, the PDL document on which the PDL file data is multiplexed. Referring to the pattern shown in FIG. 6A or 6B, the pattern is drawn by an oblique line of 2 px (pixels). Processing of generating a printed material based on a rendering image in which PDL file data is embedded is also called "multiplexing encoding processing". Note that pixel count information is multiplexed on an RGB image in the above example but pixel count information may be multiplexed on image data after conversion into CMYK data. Since, for example, yellow is a color which is not visually conspicuous, it is possible to further suppress the visual influence on the image by multiplexing on a yellow component. For example, if the number of colors is 10, when a color list for each color is 10×3×8=240 bits, a pixel count is 10×2×8=160 bits, and the total number of colors is 8 bits, the total amount is 408 bits. Since 1 bit is expressed by 8×8 pixels, an image is expressed by 51 regions. In this example, no gap is provided between the regions for positioning at the time of restoration. However, a gap may be provided depending on a restoration method. The same information may be repeatedly multiplexed. Furthermore, since as the number of colors increases, the information amount increases, the pixel count information for each color may be encoded and lossless compressed, and then multiplexed.

Color-Specific Pixel Count Information Extraction Processing

Subsequently, a multiplexed PDL extraction procedure will be described. In step S211 of FIG. 2B, a printed material on which PDL file data is multiplexed is read. First, a print document is set on a scanner device, and is read in step S211. More specifically, a scanner device is controlled to irradiate the document with LED light, and an image sensor such as a CCD facing each pixel converts reflected light into an analog electrical signal.

Next, in step S212, the analog electrical signal is digitized to input digital R, G, and B values. An arbitrary known method may be used for bitmap acquisition processing, but this embodiment will describe an example of using the following method. The following four processes are performed for each pixel of the bitmap image acquired in step S211 and formed by R, G, and B pixel values.

MTF correction
Input correction
Shading correction
Color conversion

In MTF (Modulation Transfer Function) correction, correction associated with the resolution of the reading performance of the scanner is performed. More specifically, in reading by the scanner, since an image is blurred due to a deviation from a focus position, the performance limit of a lens itself, or the like, restoration is performed to some extent by filter processing or the like. In fact, if strong enhancement processing is performed such that the deterioration is completely restored, an adverse effect of the image such as enhancement of highlight detail loss or image noise/contaminated pixel is more conspicuous, and thus design is performed to keep the balance between the adverse effect and improvement of image quality. For the sake of descriptive simplicity, an example of an edge enhancement filter for multiplying pixel values in the central portion of the image by 5 and pixel values in the upper, lower, left, and right portions by −1 will be described below.

$R'[x][y]=R[x][y]\times 5-R[x-1][y]-R[x+1][y]-R[x][y-1]-R[x][y+1]$ $G'[x][y]=G[x][y]\times 5-G[x-1][y]-G[x+1][y]-G[x][y-1]-G[x][y+1]$ $B'[x][y]=B[x][y]\times 5-B[x-1][y]-B[x+1][y]-B[x][y-1]-B[x][y+1]$ Input correction is processing of converting the output value of the CCD, which is originally a photon quantity, into brightness suitable for human visual sensitivity. More specifically, for example, an R', G', or B' signal of 4,096 tones for each color is converted into a color intensity value R", G", or B" of 1,024 tones for each color. To do this, a one-dimensional lookup table Table4[4][4096] in which a preferable printing dot count rate for the density of each ink color is set is used to obtain:

```
R" = Table4[0][R']
G" = Table4[1][G']
B" = Table4[2][B']
```

Thus, input correction can be implemented. Furthermore, a known contrivance to decrease a table size may be used. For example, the number of grids of the lookup table is decreased from 4,096 to, for example, 256, and an output value is decided by interpolating the table values of a plurality of grids.

Shading correction is processing of reducing color/density unevenness caused by a difference in reading sensitivity at each pixel position caused by the manufacturing variation or assembly variation of a lens, LED, or CCD forming the scanner device. More specifically, the R", G", or B" signal of 1,024 tones for each color is converted into the color intensity value R'", G'", or B'" of 256 tones for each color. To do this, with respect to the direction (X direction) in which the scanner lens is arranged, a one-dimensional lookup table Table5[X][3][1024] for density conversion for each X-pixel position is used to obtain:

```
R'" = Table5[x][0][R"]
G'" = Table5[x][1][G"]
B'" = Table5[x][2][B"]
```

Thus, shading correction can be implemented. Furthermore, a known contrivance to decrease a table size may be used. For example, the number of grids of the lookup table is decreased from 1,024 to, for example, 256, and an output value is decided by interpolating the table values of a plurality of grids.

Finally, color conversion processing is performed. In contrast to printing, the calculated values R'", G'", and B'" are values unique to the scanner device, and thus the color conversion processing is performed to obtain preferable values Rout, Gout, and Bout for display on the display. To do this, similar to color conversion at the time of printing, since each of the input values R'", G'", and B'" has 256 tones, a table Table6[256][256][256][3] having 16,777,216 (=256× 256×256) combinations of output values in total is prepared to obtain:

```
Rout = Table1[R'"][G'"][B'"][0]
Gout = Table1[R'"][G'"][B'"][1]
Bout = Table1[R'"][G'"][B'"][2]
```

Thus, the color conversion processing can be implemented. Furthermore, a known contrivance to decrease a table size may be used. For example, the number of grids of the lookup table is decreased from 256 to, for example, 16, and an output value is decided by interpolating the table values of a plurality of grids.

Thus, the bitmap acquisition operation in step S212 ends.

Figure 4A:
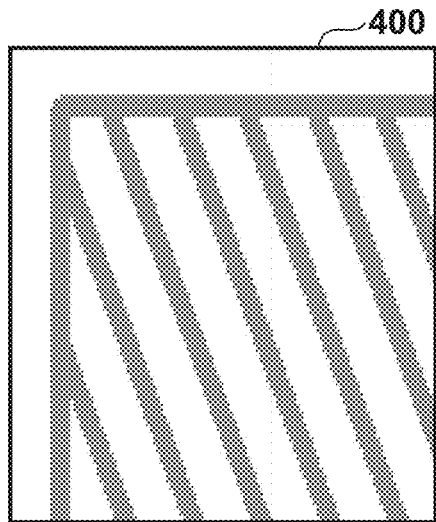
FIGS. 4A and 4B are views for explaining examples of adverse effects of an image caused by conventional printing and reading, respectively.
Figure 4B:
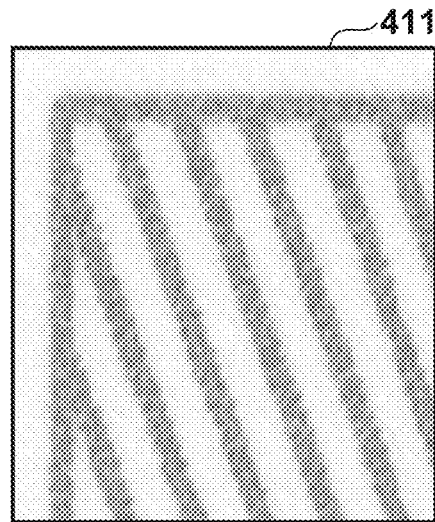

FIGS. 4A and 4B are views for explaining examples of adverse effects of an image caused by printing and reading, respectively. FIG. 4A shows the upper left portion of the object 301 in a state in which the PDL document shown in FIG. 3 is rendered, that is, the bitmap image output in step S202 of FIG. 2A.

FIG. 4B shows a portion corresponding to a position shown in FIG. 4A in the bitmap image acquired in step S212 of FIG. 2B by scanning the print document of the PDL document shown in FIG. 3.

As will be apparent by comparing FIGS. 4A and 4B, a straight line 400 shown in FIG. 4A has uniform density (R=128, G=128, and B=128) but a straight line 411 shown in FIG. 4B is nonuniform in density, and unevenness is conspicuous in the edge portion of the straight line. Furthermore, there exist pixels having slightly higher density around the straight line, and a background image is a slightly dark image as a whole. This is because in the bitmap image obtained by printing the PDL document and scanning it, image deterioration occurs for the PDL document, as follows.

Deterioration in shape caused by quantization performed in step S204 (a decrease in the number of tones caused by quantization)

Deterioration in shape caused by printing performed in step S205 (print accuracy/print sheet) Deterioration in shape caused by scanning performed in step S211 (blurring caused by the scanner)

In fact, furthermore, the following is considered.

Deterioration in shape caused by deterioration such as contamination of the print document To cope with them, in this embodiment, the processes in step S213 and the subsequent step are executed to correct the deteriorated image, thereby suppressing a decrease in image quality obtained by the scan. In step S213, the multiplexed PDL file data is extracted. An overview of an example of bitmap image analysis will be described below.

Figure 7:
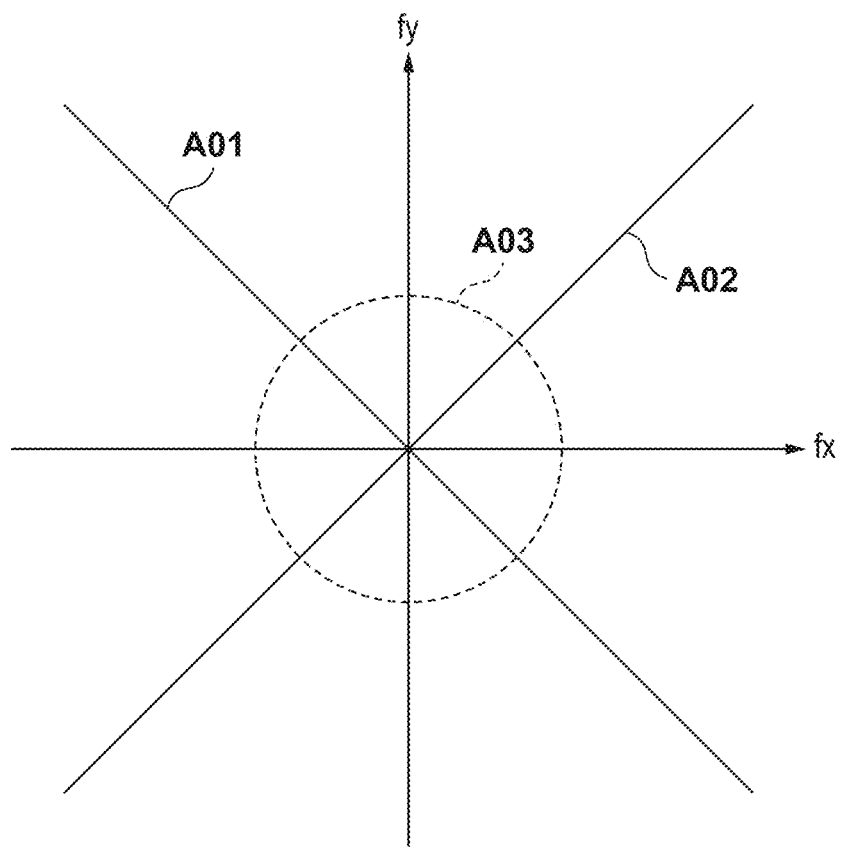
FIG. 7 is a view showing an example of the spatial frequency characteristic of an embedded pattern.

First, a position at which the multiplexed information (to also be referred to as additional information hereinafter) is embedded is detected from the image data. More specifically, an embedded position is detected by analyzing the spatial frequency characteristic of the image data. FIG. 7 is a view showing the spatial frequency characteristic of the pattern used for embedding the information. The abscissa represents the frequency in the horizontal direction, the ordinate represents the frequency in the vertical direction, and the frequency rises as it moves apart from the origin. In this embodiment, as shown in FIGS. 6A and 6B, the two patterns are embedded in the image. In the embedding example, 10 is added or subtracted to or from the B components among R, G, and B components. This causes the pattern shown in FIG. 6A to generate a large power spectrum in a line A01 shown in FIG. 7. Similarly, the pattern shown in FIG. 6B generates a large power spectrum in a line A02. By detecting this power spectrum for, for example, each region of 8×8 pixels, data of "0" or "1" is extracted. Note that by executing edge detection as preprocessing of detection, it is possible to enhance the power spectrum.

In data extraction by frequency analysis, it is necessary to accurately extract an analysis area from the image data, and thus processing of correcting the deviation of the coordinate position is performed. For example, extraction of a region of 8 pixels×8 pixels from the image and frequency analysis are repeated in the vertical and horizontal directions while shifting by one pixel in each of the vertical and horizontal directions. Then, these processes are repeated 64 times in total until 8 pixels are shifted in each of the horizontal and vertical directions, and a position at which the spectrum is largest is set as a reference position for extraction. In this case, a region to undergo frequency analysis is a region of 16 pixels×16 pixels, and if the region is within a region where the additional information is multiplexed without any gap, it should include at least one piece of additional information. Therefore, it is possible to decide the position of the region as a reference, as described above. After the completion of the position detection processing, the additional information is extracted in accordance with the multiplexing rule with reference to the position, thereby obtaining the embedded sequence of "0" and "1".

Note that if the head of the code region where the additional information is embedded is selected as a position in the image to specify the reference position by the above method, the specified reference position indicates the head of the code region. In other cases as well, since it is possible to roughly specify the position of the region, whose position is specified as a reference, in the multiplexed code string, it is possible to specify the head of the multiplexed code string with reference to the position. It is possible to specify the head of the region where the additional information is multiplexed, by analyzing the spatial frequencies with respect to the region of 8×8 pixels specified as the head and the preceding and succeeding regions of 8×8 pixels. Thus, since the length of the additional information may be fixed, the entire region where the additional information is multiplexed can be specified. The thus specified entire code region can be decoded into binary data by analyzing the spatial frequencies shown in FIG. 7.

In step S214, the extracted PDL file is saved. By extracting the PDL file from the scan image of the printed material and saving it, it is possible to acquire a document without image deterioration caused by printing and scanning. Furthermore, by executing printing again based on the image data generated from the extracted PDL file, it is possible to perform copy processing without image deterioration.

With the above-described arrangement and procedure, PDL data based on which bitmap image data has been obtained is multiplexed on the image data. This can restore, from the image, the PDL data which does not deteriorate by performing formation of an image on a medium and optical reading, thereby reproducing an image without deterioration.

[Other Examples of Multiplexing Method]

The example of embedding information for every 8×8 pixels has been explained with reference to FIGS. 5A, 5B, 6A, and 6B. This is an example of embedding an image in a high-frequency region so that it is difficult for the user to visually recognize the image. However, in addition to multiplexing on the high-frequency region, an arbitrary multiplexing method may be performed.

Figure 8A:
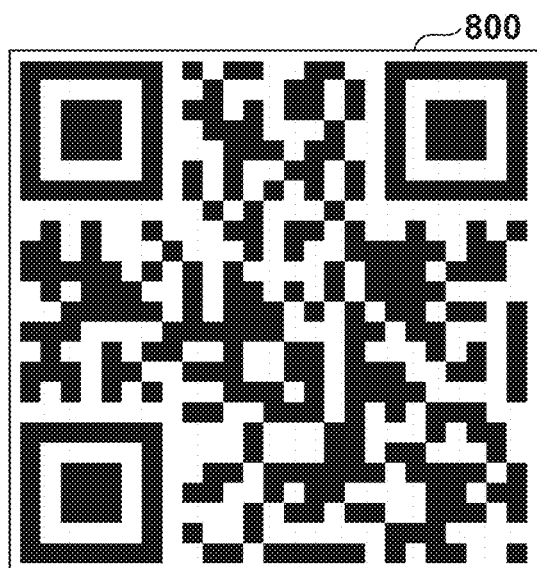
FIGS. 8A and 8B are views showing another example of multiplexing.
Figure 8B:
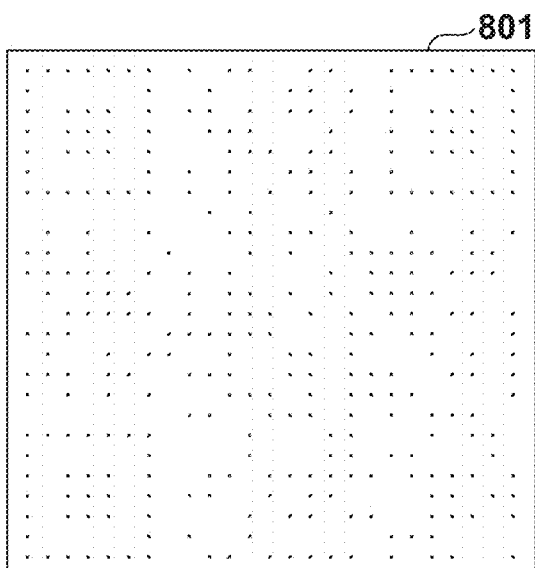

FIGS. 8A and 8B show another example of a multiplexing method. FIG. 8A shows an example of a pattern of a QR code® as one of matrix two-dimensional codes. In this example, a QR code is generated from PDL file data, and is multiplexed on a printed material in a form difficult to visually recognize. FIG. 8B shows an actual print pattern, which is a pattern obtained by printing only one dot for every 8×8 pixels. A dot corresponding to a black pixel in 800 of FIG. 8A corresponds to one dot in 801 of FIG. 8B. No dot is formed in FIG. 8B at a position corresponding to a blank pixel in FIG. 8A.

This can form, on a print sheet, a multiplexing pattern difficult to visually recognize. More specifically, in step S203 of FIG. 2A, a QR code is generated from the PDL file data, as shown in FIG. 8A, and is then superimposed, on the rendering image, as print data shown in FIG. 8B as separated dots. Since, as ink forming the separated dots, yellow ink is most difficult to visually recognize, the pattern shown in FIG. 8B is formed by yellow ink, thereby making it possible to form, on the print sheet, the multiplexing pattern which is more difficult to visually recognize. The original image may include a yellow component, but interference by the yellow component of the original image data in the region of the QR code can be prevented by replacing the yellow component by the pattern shown in FIG. 8B corresponding to the QR code. This can restore the image from the QR code as described in the PDL data.

In the case of this multiplexing method, in the PDL data extraction processing in step S213, it is determined, for every 8×8 pixels in the read bitmap image, whether a yellow dot is printed. Then, the QR code pattern corresponding to FIG. 8A is reconstructed from the pattern of the yellow component shown in FIG. 8B, and then decoded. This extracts the PDL file data. At the time of reconstruction, the 8×8 region including the yellow dot is replaced by one black cell of the QR code. Note that information to be multiplexed may be pixel count information for each color, similar to the first embodiment. In this case, a QR code is generated from the color-specific pixel count information, and is multiplexed on the image data, as shown in FIG. 8B.

Note that if one QR code has an insufficient capacity, the PDL data may be divided and encoded in a plurality of QR codes, and then multiplexed. In this case, the QR code to be embedded at the start position may include a division number.

As another multiplexing example, there is provided a method of performing threshold modulation at the time of quantization processing in the print image generation processing in step S204 of FIG. 2A, and performing multiplexing (Japanese Patent No. 4187749). This method may be used.

The various multiplexing examples have been described above. In general, if an information amount to be multiplexed increases, it is necessary to increase the printing dot count or a modulation amount, resulting in an increase in image deterioration of the entire print image.

As described above, since the document page 300 shown in FIG. 3 is formed with a width of 600 pixels and a height of 900 pixels, one page is formed by 540,000 pixels as a whole. When the color of each pixel is represented by 256 tones for R, G, and B components each formed by 8 bits, each pixel has a size of 3 bytes and one page has a size of 1,620,000 bytes≈1.6 Mbytes in total. On the other hand, a file size in the PDL format is 106,200 bytes, and is about 6.6% of the above size. The breakdown of calculation of the file size is as follows.

Drawing command portion: about 350 characters (≈700 bytes when one character has a size of 2 bytes).

"PORTRAIT.jpg": 427,500 bytes in total when the file has a size of 300×475 pixels and each pixel has a size of 3 bytes. When a compression ratio is 20%, a size of 85,500 bytes is obtained.

"STD" font data: 20,000 bytes assumed for reasons to be described later.

In this example, as an example of the font size, calculation is performed based on the information disclosed in Japanese Patent Laid-Open No. 2008-186165. Japanese Patent Laid-Open No. 2008-186165 describes, as follows.

"When performing calculation for 20 pages, the PDL size without font embedding is about 60 KB while the PDL size with font embedding is 460 KB which is a nearly 900% increase. (Calculation is performed by assuming that new characters per page account for 75%.)"

A font embedding amount for one page is assumed to be 400 Kbytes/20=20 Kbytes.

As described above, as compared with the image rendered in step S202, the PDL size acquired in step S201 is as small as about 6.6%. Therefore, when multiplexing on a print document, it is possible to significantly reduce image deterioration of the entire print image caused by multiplexing by multiplexing not the bitmap image but the PDL file.

Furthermore, by directly embedding the PDL data, it is possible to completely restore the PDL file by scanning the document. In this case, since all the drawing commands associated with FIG. 3 can be restored, for example, the image shown in FIG. 4B can be made identical to that shown in FIG. 4A. Similarly, characters and thin lines like the objects 303 and 304 in FIG. 3 can also be restored. The copy processing generally cannot avoid image deterioration since the reading step and printing step are performed. However, if the original document PDL data can be extracted at the time of scanning, it is possible to implement an almost complete copy by printing the extracted PDL data.

Furthermore, if reduction or enlargement is performed at the time of printing, the thin lines and characters are conventionally thinned or thickened. In the worst case, the characters and thin lines are unreadable or disappear. However, if the invention according to this embodiment is used, the multiplexed PDL data need only be extracted.

As another approach, since the characters and thin lines are also reduced or enlarged conventionally at the time of making a reduced or enlarged copy, the readability may deteriorate. However, if the PDL data can be extracted as in this embodiment, it is possible to change the size based on vector data with respect to a TEXT drawing command, and thus the following services can be implemented.

"Reduced copy while maintaining character size" by setting reduction of 50%+character size of 200%

"Enlarged copy while maintaining character size" by setting enlargement of 200%+character size of 50%

"Character enlarged copy" by setting non-magnification+character size of 200%

"Character reduced copy" by setting non-magnification+character size of 50%

As described above, characters as vector data hardly deteriorate by variable magnification, and only characters can be magnified, thereby making it possible to change the size using this. Similarly, in copy processing, it is possible to arbitrarily change the thickness of a line, the type and color of a line, a painting pattern, and the like with respect to another command such as a LINE drawing command.

With the above-described arrangement and procedure, PDL data based on which image data is obtained is encoded in, for example, a matrix two-dimensional code, and multiplexed on bitmap image data generated from the PDL data. This can restore, from an image, PDL data which does not deteriorate by forming the image on a medium and optically reading it, thereby reproducing an image without deterioration.

Second Embodiment

The first embodiment has explained the example of embedding the whole PDL file in the rendered bitmap image. This embodiment will describe an example of preferably reducing the PDL file size to avoid image deterioration when the PDL file size is large. In this embodiment, multiplexing PDL data with a reduced file size is created and multiplexed instead of multiplexing the PDL file intact.

Figure 9:
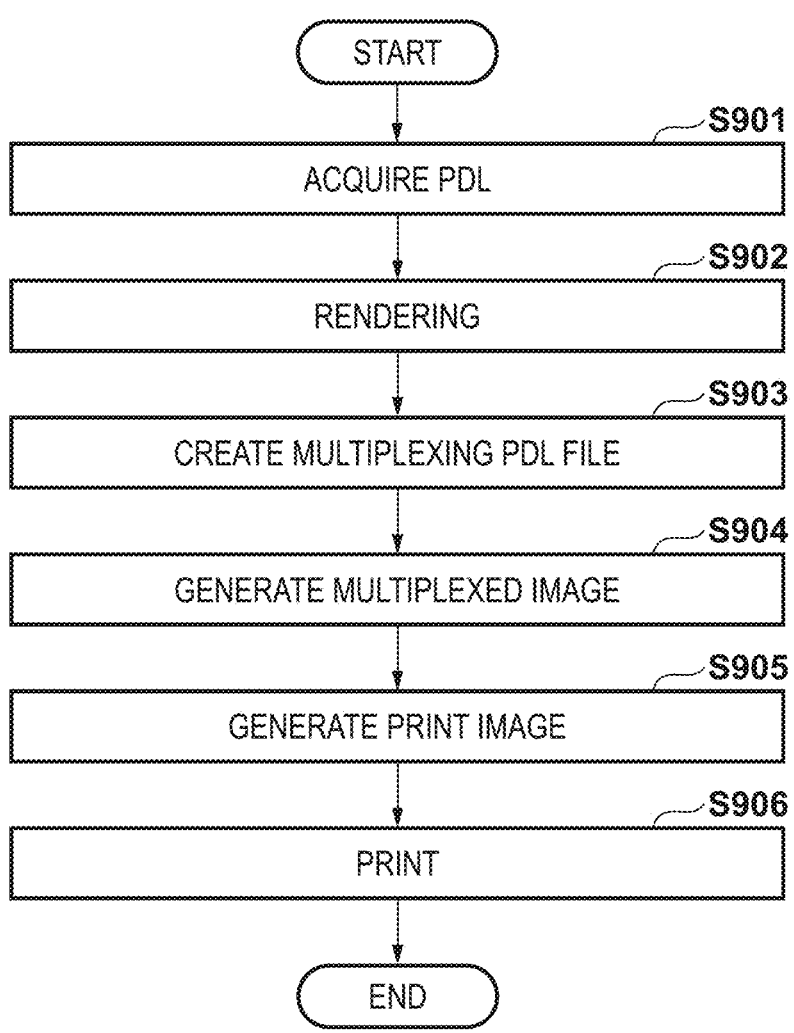
FIG. 9 is a flowchart for explaining a PDL multiplexed printing procedure according to the second embodiment.

FIG. 9 is a flowchart for explaining a PDL multiplexed printing procedure according to the second embodiment. In FIG. 9, processes in steps S901 and S902 are the same as those in steps S201 and S202 of FIG. 2 and a description thereof will be omitted.

In step S903, a multiplexing PDL file with a reduced file size is created by deleting an image file (bitmap image) from a PDL file. Particularly, the reason for deleting the image file is that the file size of the image file is largest, as described in the breakdown of calculation of the file size in the first embodiment. On the other hand, since the drawing command portion has a smallest file size, and includes thin line and character drawing commands, the drawing command portion is preferably, preferentially included in the multiplexing PDL file. Font data having an intermediate size is a necessary element for character drawing, and is thus preferably included in the multiplexing PDL file.

Figure 10:
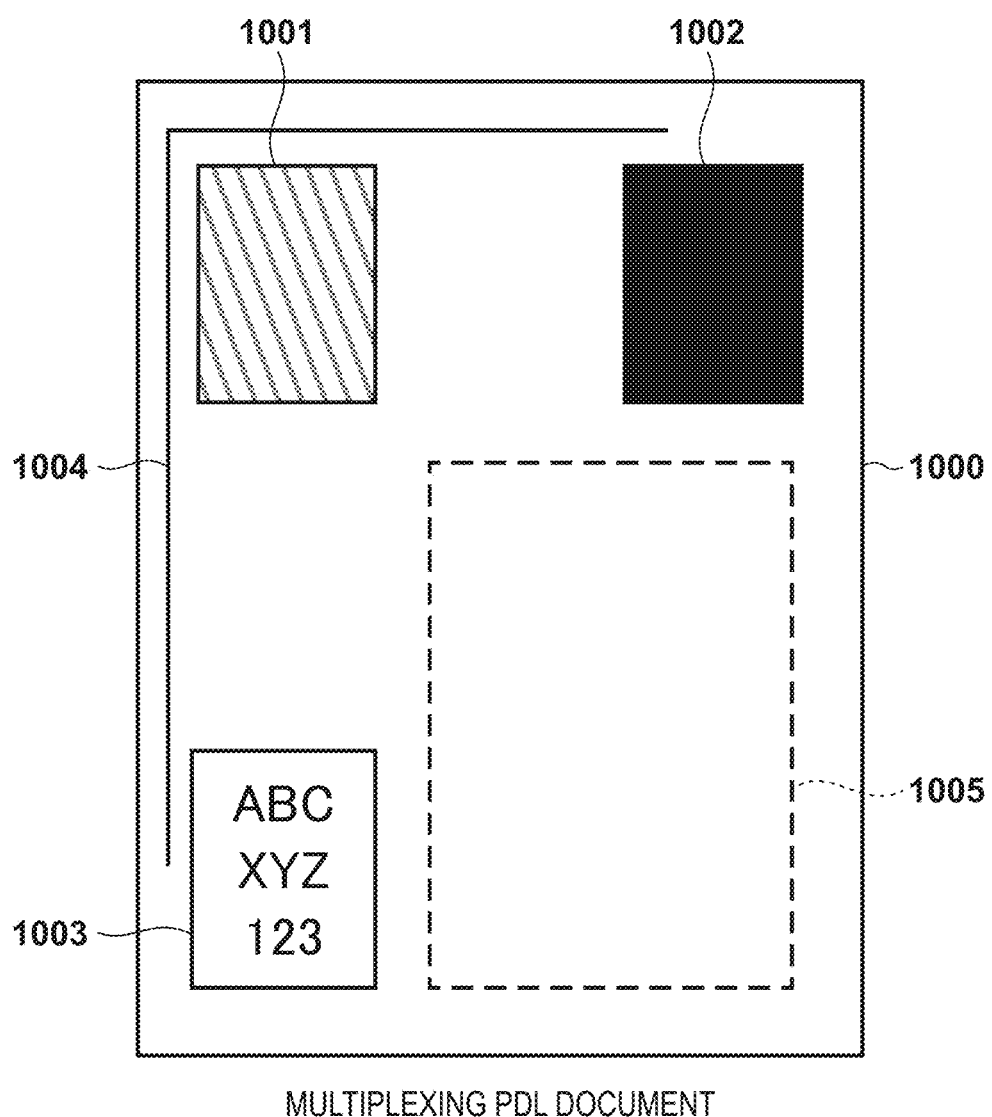
FIG. 10 is a view for explaining an example of a multiplexing PDL document according to the second embodiment.

FIG. 10 is a view for explaining an example of a multiplexing PDL document according to the second embodiment. In FIG. 10, objects 1000 to 1004 are the same as the objects 300 to 304 in FIG. 3 and a description thereof will be omitted. However, a region 1005 shown in FIG. 10 is different from the bitmap image 305 shown in FIG. 3, and includes no image file. The region 1005 indicates a region where the bitmap image was arranged in the original PDL data. As an implementation method, various methods can be adopted. For example, the following methods are plausible.

An IMAGE drawing command in the multiplexing PDL file is described in a state of "absence of file" like
<IMAGE> 250, 350, 550, 825, " "</IMAGE>
The multiplexing PDL file is configured not to include a "PORTRAIT.jpg" file, thereby making it impossible to execute an IMAGE drawing command.

An IMAGE drawing command in the multiplexing PDL file is described like
<IMAGE> 250, 350, 550, 825, "NULL.jpg"</IMAGE>
thereby additionally performing replacement by "NULL.jpg" as "an image including a very small number of pixels (example: a blank image of 8×8 pixels)".

In this embodiment, among these methods, the method of describing a command in a state of "absence of file" is adopted. The reason for this is that it is possible to notify an apparatus which has restored the multiplexed PDL data from the image that "the file has been deleted" clearly "at the time of PDL decoding" using a scanner.

Figure 11:
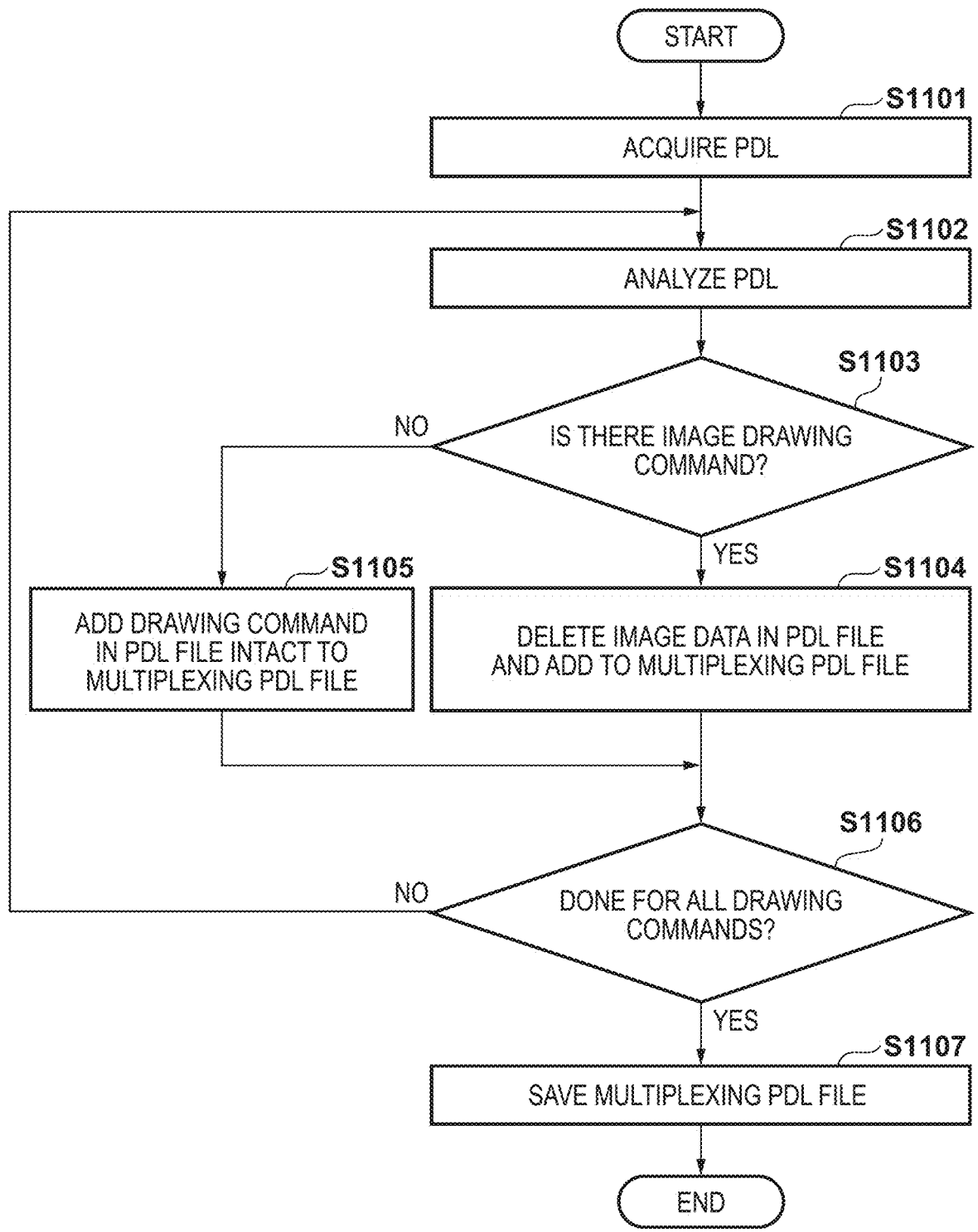
FIG. 11 is a flowchart for explaining a multiplexing PDL generation procedure according to the second embodiment.

FIG. 11 is a flowchart for explaining a multiplexing PDL generation procedure according to the second embodiment. In step S1101, the PDL file is acquired. Subsequently, in step S1102, the PDL file is analyzed. The PDL file is analyzed by sequentially focusing on, from the first row, the commands included in the PDL file used in the first embodiment.

It is determined in step S1103 whether the focused command is an IMAGE drawing command. If the determination result is YES, the process advances to step S1104; otherwise, the process advances to step S1105.

In step S1104, image data in the PDL file is deleted and the focused command is added to a multiplexing PDL file. More specifically, as described above, the file name in the IMAGE drawing command is replaced by " ", and added to the multiplexing PDL file.

In step S1105, the drawing command in the PDL file is added intact to a multiplexing PDL file.

In step S1106, it is determined whether the processing ends for all the drawing commands. If the determination result is YES, the process advances to step S1107; otherwise, the process returns to step S1102 to continue the processing. As a practical method of determining the end of the processing for all the drawing commands, a method of determining whether a </PAGE> tag indicating the end of the page is reached can be adopted.

In step S1107, the generated multiplexing PDL file is saved. An example of the multiplexing PDL file generated in this embodiment will be described below.

```
<PAGE=001>
    <BOX> 50, 75, 200, 300, GRAY, STRIPE </BOX>
    <BOX> 420, 75, 550, 300, BLACK, FULL </BOX>
    <BOX> 50,620, 200, 825, BLACK, NULL </BOX>
    <TEXT> 50,620, 200, 825, BLACK, STD-18, "ABCXYZ123"
    </BOX>
    <LINE> 25, 25, 25, 700, BLACK, PLAIN, 3 </LINE>
    <LINE> 25, 25, 450, 25, BLACK, PLAIN, 3 </LINE>
    <IMAGE> 250, 350, 550, 825, " " </IMAGE>
</PAGE>
```

The difference from the PDL file in the first embodiment is that the file name in the <IMAGE> drawing command of the eighth row is " ".

Referring back to FIG. 9, in step S904, an image is generated by multiplexing the multiplexing PDL file generated in step S903 on the rendering image. In this example, the PDL file size to be multiplexed is reduced, as compared with the first embodiment, thereby reducing image deterioration caused by multiplexing.

Processes in steps S905 and S906 are the same as those in step S204 and S205 of FIG. 2A and a description thereof will be omitted.

From the thus formed image data, the PDL data can be restored by the procedure shown in FIG. 2B. However, the IMAGE drawing command of the PDL data restored from the scanned image includes no image file. To cope with this, when generating an image, if the image file in the IMAGE drawing command included in the restored PDL data is null, the image data of the corresponding region is extracted from the scanned image data. Then, the image data is used as an image file to be drawn by the IMAGE drawing command to reconstruct the PDL data, and the PDL data is saved.

In this way, the PDL decoding side can generate PDL data including an image portion while restoring the shapes of characters and thin lines by a method of, for example, performing combination with an image portion corresponding to the region of the IMAGE drawing command in the scanned image. Furthermore, the data amount of the font data is the second largest after the data amount of the image file. Therefore, for example, if it is ensured that there is no problem even if multiplexing is not performed, for example, if the font designated by the TEXT command is held as a standard in the PC 50 or MFP 40, the font data may be deleted from the multiplexed PDL file.

As described above, it is possible to reproduce high-quality image at the time of reproduction by multiplexing the PDL data on the image. In addition, by excluding the bitmap image data of a large size from the PDL data to be multiplexed, it is possible to reduce the data size to be multiplexed.

Third Embodiment

The second embodiment has explained the example of determining whether to include a drawing command in a multiplexing PDL file in accordance with the type of the drawing command in the PDL data. This embodiment will describe an example of making decision in accordance with the actual size of a drawing command or the like. The above description assumes that IMAGE drawing command+image file size>another drawing command. In fact, however, even an image file may have a small file size because it includes a small number of pixels. Conversely, if the number of LINE drawing commands is large, even the LINE drawing commands have a large file size.

A box object 302 shown in FIG. 3 will be exemplified. A drawing command corresponding to the box object 302 has been described as

<BOX> 420, 75, 550, 300, BLACK, FULL </BOX>

On the other hand, for example, the box object 302 can be described by two BOX drawing commands given by <BOX> 420, 75, 500, 300, BLACK, FULL </BOX>
<BOX> 500, 75, 550, 300, BLACK, FULL </BOX>

Since a drawing command to be used is determined in accordance with the specifications of an application operating on a PC 50, there can exist, for example, an application having specifications of describing all pixels by LINE commands on a pixel basis without using BOX drawing commands.

If a LINE command is described for each pixel, the object 302 shown in FIG. 3 is formed by 29,606 (=(550−420+1)× (300−75+1)) LINE drawing commands, as follows.

⟨LINE⟩ 420, 75, 420, 75, BLACK, FULL ⟨/BOX⟩

⟨LINE⟩ 421, 75, 421, 75, BLACK, FULL ⟨/BOX⟩

...

⟨LINE⟩ 550, 75, 550, 75, BLACK, FULL ⟨/BOX⟩

⟨LINE⟩ 420, 76, 420, 76, BLACK, FULL ⟨/BOX⟩

...

⟨LINE⟩ 550, 300, 550, 300, BLACK, FULL ⟨/BOX⟩

Since one LINE drawing command is formed by 43 characters, one drawing command has a size of 86 bytes when one character has a size of 2 bytes. Therefore, 29,606 drawing commands have a size of 86×29,606=2,546,116 bytes 2.6 Mbytes in total. This is larger than the PDL file size of 106,200 bytes used in the first embodiment, and is larger than the rendering image data size of 1,620,000 bytes 1.6 Mbytes. As described above, even if character/line drawing commands are included in the multiplexing PDL file, image deterioration may be too large. To cope with this, in this embodiment, the PDL data is divided into PDL data each for a region of a predetermined size, the PDL size of each region is compared with a predetermined threshold size, and then the PDL data of the region having a size equal to or smaller than the threshold size is set as multiplexed PDL data. This suppresses the size of the PDL data to be multiplexed.

Figure 12:
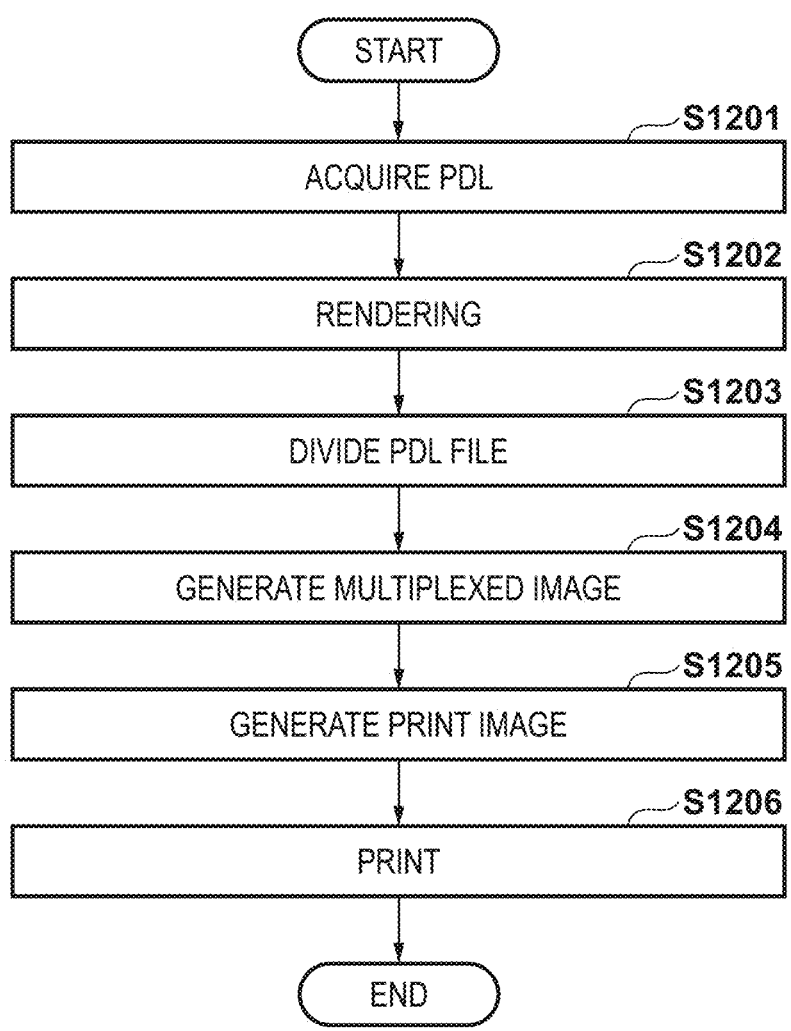
FIG. 12 is a flowchart for explaining a tile division adaptive PDL multiplexed printing procedure according to the third embodiment.

FIG. 12 is a flowchart for explaining a tile division adaptive PDL multiplexed printing procedure according to the third embodiment. Processes in steps S1201 and S1202 are the same as those in steps S901 and S902 in FIG. 9 and a description thereof will be omitted. In step S1203, PDL data is divided into PDL data each for a region of a predetermined size.

Figure 13:
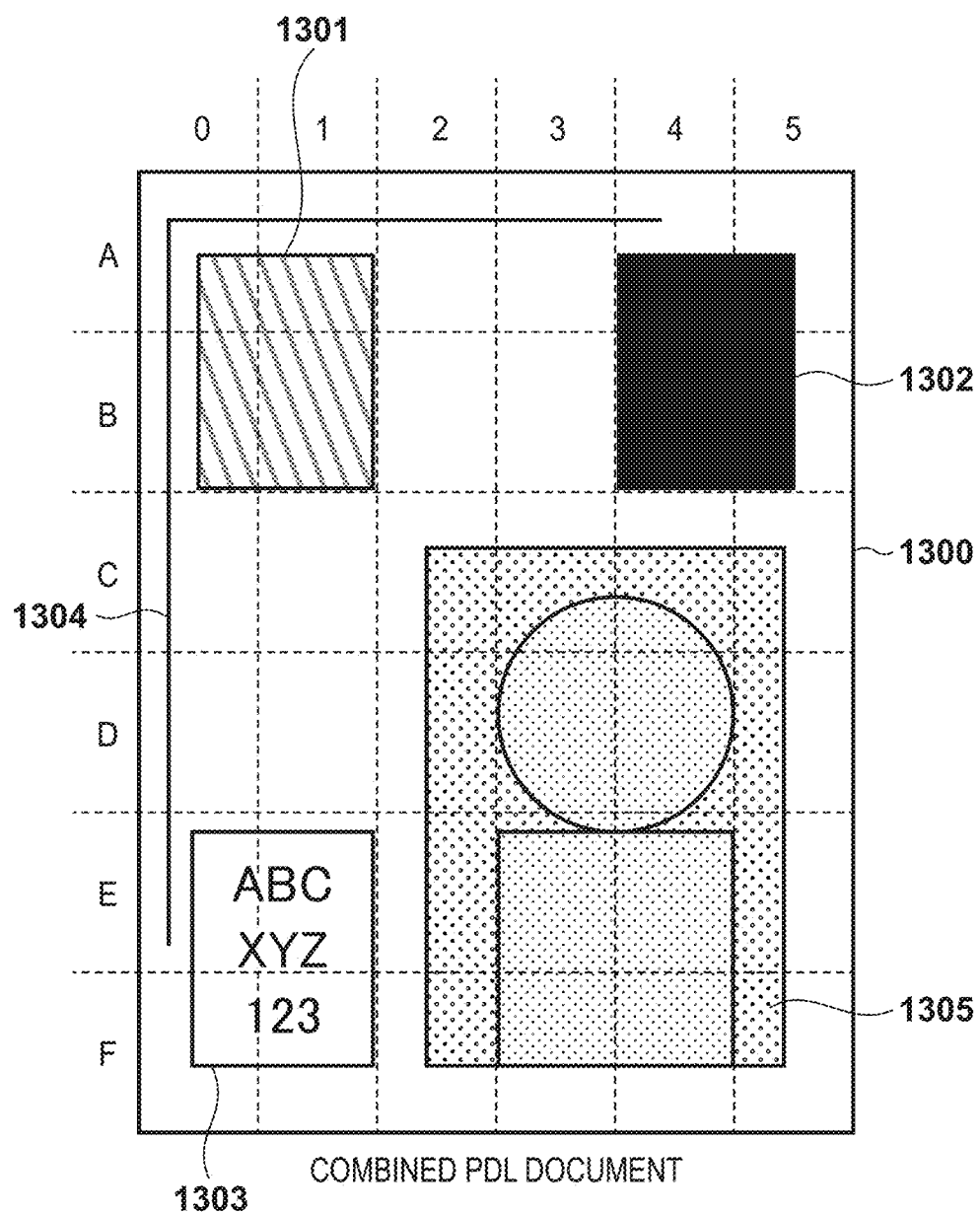
FIG. 13 is a view for explaining an example of a tile division PDL document according to the third embodiment.

FIG. 13 is a view for explaining an example of a tile division PDL document according to the third embodiment. In FIG. 13, objects 1301 to 1305 are the same as the objects 301 to 305 in FIG. 3 and a description thereof will be omitted. In this embodiment, a document page 1300 shown in FIG. 13 is divided into 36 (=6×6) regions. Broken lines represent region boundaries, numbers of 0 to 5 described on the upper side of the document page 1300 indicate division region numbers in the horizontal direction, and alphabetic characters of A to F described on the left side of the document page 1300 indicate the division region numbers in the vertical direction. Each region is represented by "region (alphabetic character)(number)". For example, the upper left region is "region A0" and the upper right, lower left, and lower right regions are represented by "region A5", "region F0", and "region F5", respectively. Furthermore, the size of each region is a size of 100 pixels in the horizontal direction×150 pixels in the vertical direction. The region size can be arbitrarily set. However, as the region size is smaller, the number of regions is larger.

Figure 14:
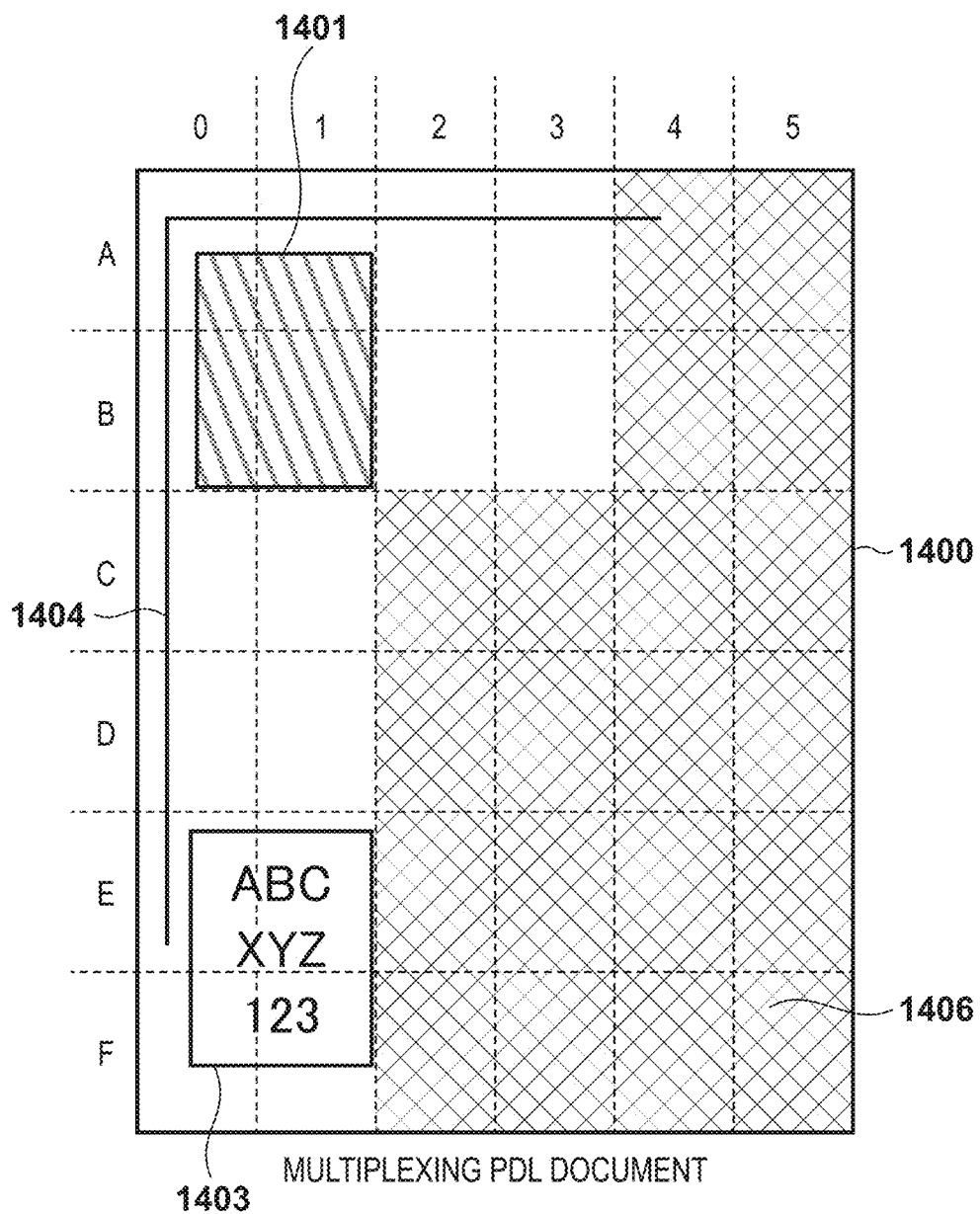
FIG. 14 is a view for explaining an example of a tile division multiplexing PDL document according to the third embodiment.

FIG. 14 is a view for explaining an example of a tile division multiplexing PDL document according to the third embodiment. In FIG. 14, reference numerals 1400 to 1404 denote the same components as those denoted by reference numerals 1300 to 1304 in FIG. 13 and a description thereof will be omitted. A hatching region 1406 represents a region for which the PDL data size of each division region in the multiplexing PDL file exceeds a threshold. A rectangular region including the regions C2 to F5 in the hatching region 1406 is a region corresponding to the image drawing region 1305 shown in FIG. 13. A rectangular region including the regions A4 to B5 corresponds to the solid portion 1302 shown in FIG. 13, and is formed from many LINE drawing commands in this embodiment, as described above.

In this way, by excluding a region having a large data size from the multiplexing PDL generation target, it is possible to suppress the data size of the multiplexing target to a small size, and reduce the degree of image deterioration.

Figure 15:
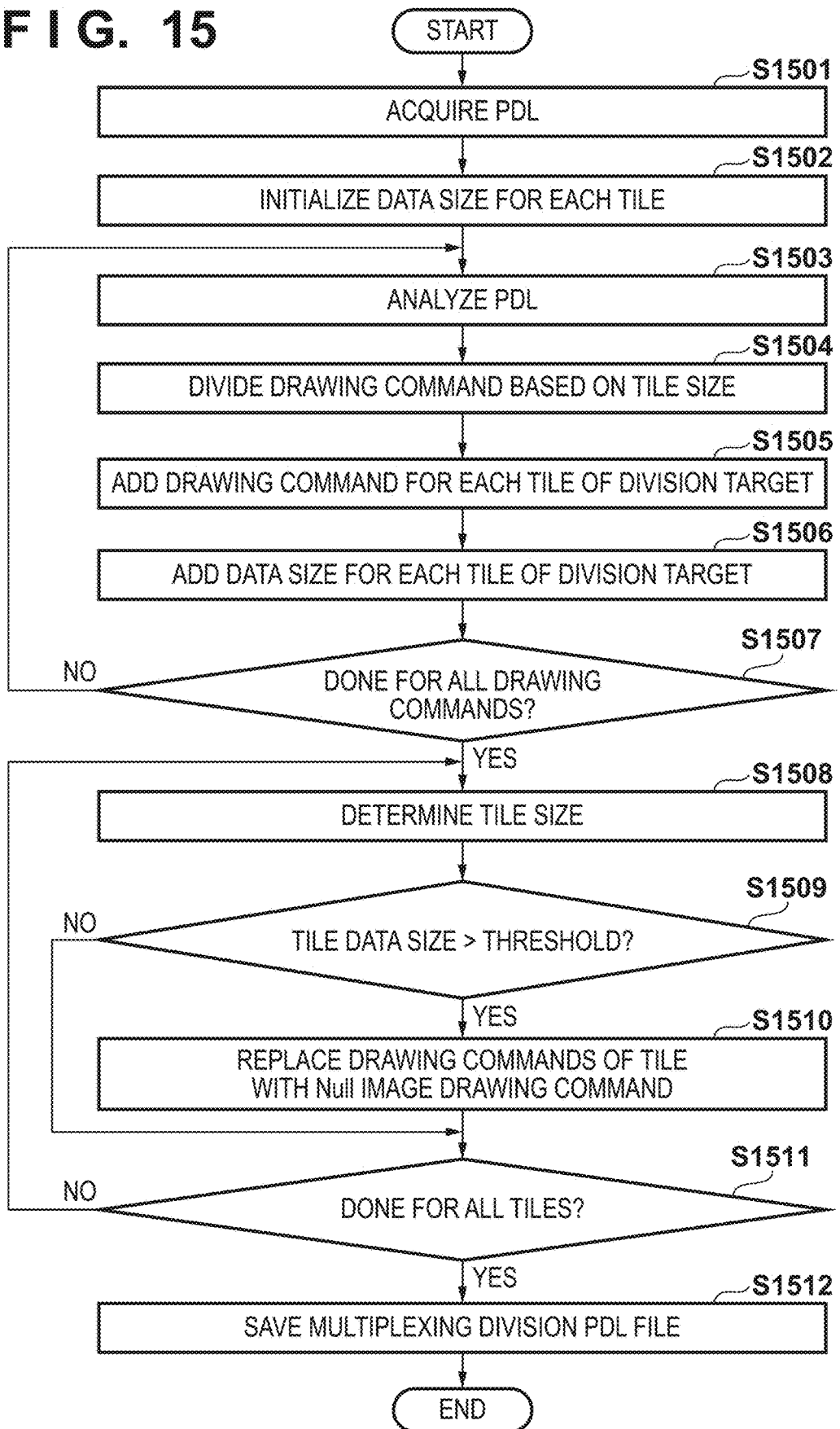
FIG. 15 is a flowchart for explaining a multiplexing division PDL generation procedure according to the third embodiment.

FIG. 15 is a flowchart for explaining a multiplexing division PDL generation procedure according to the third embodiment. First, in step S1501, the PDL file is acquired.

In step S1502, a variable SIZE XY representing the data size of each tile (each of the 36 regions A0 to F5) is initialized (=0) by:

SIZE_A0 = 0

SIZE_A1 = 0

...

SIZE_F5 = 0

In step S1503, the drawing commands are analyzed. Similar to step S1102 of FIG. 11, the PDL file is analyzed by sequentially focusing on the commands from the first row.

In step S1504, each drawing command is divided based on the tile size. For example,

<BOX> 50, 75, 200, 300, GRAY, STRIPE </BOX> of the second row is a drawing command corresponding to the region 1301 shown in FIG. 13 and crossing over the four regions A0 to B1. Therefore, it is necessary to describe the above command for each region. In step S1505, a drawing command is added for each tile of the division target.

In a state in which division of the BOX drawing command of the second row is complete, the multiplexing PDL data of each region is as follows.

```
<PAGE=001>
<AREA=A0>
<BOX> 50, 75, 200, 300, GRAY, STRIPE </BOX>
</AREA>
<AREA=A1>
<BOX> 50, 75, 200, 300, GRAY, STRIPE </BOX>
</AREA>
<AREA=B0>
<BOX> 50, 75, 200, 300, GRAY, STRIPE </BOX>
</AREA>
<AREA=B1>
<BOX> 50, 75, 200, 300, GRAY, STRIPE </BOX>
</AREA>
</PAGE>
```

Assume that each drawing command ignores drawing at a position outside the region. This simplifies the processing by assuming "division of drawing command=copy of drawing command".

Next, in step S1506, the data size is added for each tile of the division region.

Since the BOX drawing command of the second row is formed by 43 characters, the data size of each division region is increased by 86 bytes when one character has a size of 2 bytes. At this time, the data sizes of the respective regions are

SIZE_A0 = 86

SIZE_A1 = 86

SIZE_A2 = 0

...

SIZE_B0 = 86

SIZE_B1 = 86

SIZE_B2 = 0

...

SIZE_F5 = 0

Estimation is performed by assuming that one drawing command has a size of about 86 bytes.

In step S1507, it is determined whether division ends for all the drawing commands. If the determination result is YES, the process advances to step S1508; otherwise, the process advances to step S1503 to perform division of the drawing command of the next row.

From the third row, since many LINE commands are repeated, as described above, the data sizes of the four regions A4 to B5 become very large. More specifically, $SIZE\_A4 = 529{,}416 \, (= 86 \times (500-420+1) \times (150-75+1))$ $SIZE\_A5 = 333{,}336 \, (= 86 \times (550-500+1) \times (150-75+1))$ $SIZE\_B4 = 1{,}051{,}866 \, (= 86 \times (500-420+1) \times (300-150+1))$ $SIZE\_B5 = 662{,}286 \, (= 86 \times (550-500+1) \times (300-150+1))$ From step S1508, determination of the data size of each region is performed. In step S1509, it is determined whether the data size of the determination target region exceeds the threshold. If the determination result is YES, the process advances to step S1510; otherwise, the process advances to step S1511. As the threshold, a necessarily and sufficiently small value is preferably set. However, in this embodiment, a size of 3,010 bytes (=86×35) is set by setting 35 drawing commands as a standard. Thus, the size is 108,360 bytes at most for 36 regions, which is almost equal to the PDL file size calculated in the first embodiment.

In step S1510, with respect to the region whose size exceeds the threshold, the drawing commands are replaced by a Null image drawing command. More specifically, similar to the second embodiment, the following one command is described.

<IMAGE> 250, 350, 550, 825, " "</IMAGE>

Therefore, with respect to the region whose data size exceeds the threshold, the number of drawing commands is one and the size is about 86 bytes.

In step S1511, it is determined whether confirmation ends for all the regions (the 36 regions in this embodiment). If the determination result is YES, the process advances to step S1512; otherwise, the process returns to step S1508 to determine the data size of the next region.

In step S1512, the multiplexing division PDL data of all the regions are combined to generate a multiplexing PDL file, and the multiplexing PDL file is saved.

As described above, it is possible to generate a multiplexing PDL file in which the PDL data size of each region does not exceed the threshold.

Referring back to FIG. 12, in step S1204, the multiplexing PDL file generated in step S1203 is multiplexed on the rendering image generated in step S1202, thereby generating a multiplexed image. Processing contents in steps S1204 to S1206 are the same as those in steps S904 to S906 of FIG. 9 and a description thereof will be omitted.

When the thus generated image data is printed and scanned, the multiplexed PDL data can be restored by the procedure shown in FIG. 2B. With respect to a region whose data amount exceeds the predetermined value, a drawing command at a designated position of the region can be restored from the restored PDL data but the contents of the drawing command are deleted. The restored PDL data and the scanned image data may be saved. Alternatively, among the drawing commands of the restored PDL data, the command whose contents are null may be replaced by an IMAGE drawing command. In this case, a portion of the scanned image data corresponding to the region designated by the drawing command may be converted into a file and then designated as data to be written in the region.

As described above, it is possible to reduce image deterioration caused by multiplexing by reducing the data size of the multiplexing PLD file. The method according to this embodiment can reduce image deterioration by excluding, from multiplexing target data, the region whose drawing command size is large, regardless of the type of the drawing command.

Similar to the second embodiment, in a region of a large size, it is explicit that a drawing command existed in an original region, as described by

<IMAGE> 250, 350, 550, 825, " "</IMAGE>

Therefore, the PDL decoding side can generate PDL data including an image portion while restoring the shapes of characters/thin lines by a method of, for example, performing combination with an image portion corresponding to the region of the IMAGE drawing command in a scanned image.

Furthermore, in this embodiment, the size is reduced by focusing on the number of drawing commands in the PDL data. However, by additionally setting a threshold for each of a font data size and an image data size, it may be determined whether to include the data in multiplexed PDL data.

According to this embodiment, with the above-described arrangement, it is possible to suppress the upper limit of the data amount of PDL data to be multiplexed on image data to the total sum of multiplexing thresholds of respective regions, each for determining whether to perform multiplexing. Therefore, if the upper limit of the data amount is set to a data amount that can be multiplexed on an image to be formed on one sheet, it is possible to reliably multiplex the encoded PDL data on one sheet. In addition, it is possible to obtain the advantages of the above-described first and second embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-039527, filed Mar. 11, 2021 which is hereby incorporated by reference herein in its entirety.

What is claimed is:

1. An information processing apparatus connected to (a) a printing unit configured to print an image based on image data and (b) a scanning unit configured to read an image as image data, the information processing apparatus comprising:

one or more processors and one or more memories comprising one or more programs, wherein the one or more programs are configured to cause the one or more processors to (1) generate image data based on document data described in a page description language, (2) encode the document data to be multiplexed on the image data, (3) output the image data to the printing unit, (4) restore the multiplexed document data from the image data read by the scanning unit, and
(5) save (a) the image data read by the scanning unit and (b) the restored document data,
wherein in a case that an object included in the document data is an image, the document data obtained by excluding the object is multiplexed on the image data, and
wherein the excluded object is to be printed by the printing unit.

2. The apparatus according to claim 1, wherein the one or more programs are further configured to cause the one or more processors to reproduce an image based on (a) the saved image data and (b) the saved document data.

3. The apparatus according to claim 2, wherein if there exists an object not included in the saved document data, the one or more programs are further configured to cause the one or more processors to reproduce the object by the saved image data corresponding to the object.

4. The apparatus according to claim 1, wherein the document data is encoded and multiplexed on a high-frequency component of the image.

5. The apparatus according to claim 1, wherein the document data is encoded in a two-dimensional matrix code, and is multiplexed on the image by replacing a pixel of a predetermined color component corresponding to the two-dimensional matrix code.

6. The apparatus according to claim 1, wherein the printing unit is included in the apparatus.

7. The apparatus according to claim 1, wherein the scanning unit is included in the apparatus.

8. An information processing apparatus connected to a printing unit configured to print an image based on image data, the information processing apparatus comprising:
one or more processors and one or more memories comprising one or more programs, wherein the one or more programs are configured to cause the one or more processors to
(1) generate image data based on document data described in a page description language,
(2) encode the document data to be multiplexed on the image data, and
(3) output the image data to the printing unit,
wherein in a case that an object included in the document data is an image, the document data obtained by excluding the object is multiplexed on the image data, and
wherein the excluded object is to be printed by the printing unit.

9. An information processing apparatus connected to a scanning unit configured to read, as image data, an image on which document data described in a page description language is multiplexed, the information processing apparatus comprising:
one or more processors and one or more memories comprising one or more programs, wherein the one or more programs are configured to cause the one or more processors to
(1) restore the multiplexed document data from the image data read by the scanning unit, and
(2) save (a) the image data read by the scanning unit and (b) the restored document data,
wherein in a case that an object included in the document data is an image, the document data obtained by excluding the object is multiplexed on the image data, and
wherein the excluded object is to be printed.

10. An information processing apparatus connected to (a) a printing unit configured to print an image based on image data and (b) a scanning unit configured to read an image as image data, the information processing apparatus comprising:
one or more processors and one or more memories comprising one or more programs, wherein the one or more programs are configured to cause the one or more processors to
(1) generate image data based on document data described in a page description language,
(2) encode the document data to be multiplexed on the image data,
(3) output the image data to the printing unit,
(4) restore the multiplexed document data from the image data read by the scanning unit, and
(5) save (a) the image data read by the scanning unit and (b) the restored document data,
wherein with respect to each of a plurality of regions obtained by dividing the image data generated from the document data, in a case where there is a region in which a data amount of objects included in the region exceeds a predetermined value, document data obtained by excluding the objects included in the region is multiplexed on the image data.

11. The apparatus according to claim 10, wherein the document data obtained by excluding the objects includes a drawing command including the region of the objects.

12. A non-transitory computer-readable medium storing at least one program, wherein the at least one program is configured to cause a computer, connected to (a) a printing unit configured to print an image based on image data and (b) a scanning unit configured to read an image as image data, to
(1) generate image data based on document data described in a page description language,
(2) encode the document data to be multiplexed on the image data,
(3) output the image data to the printing unit,
(4) restore the multiplexed document data from the image data read by the scanning unit, and
(5) save (a) the image data read by the scanning unit and (b) the restored document data,
wherein in a case that an object included in the document data is an image, the document data obtained by excluding the object is multiplexed on the image data, and
wherein the excluded object is to be printed by the printing unit.

13. A non-transitory computer-readable medium storing at least one program, wherein the at least one program is configured to cause a computer, connected to a printing unit configured to print an image based on image data, to
(1) generate image data based on document data described in a page description language,
(2) encode the document data to be multiplexed on the image data, and
(3) output the image data to the printing unit,
wherein in a case that an object included in the document data is an image, the document data obtained by excluding the object is multiplexed on the image data, and
wherein the excluded object is to be printed by the printing unit.

14. A non-transitory computer-readable medium storing at least one program, wherein the at least one program is configured to cause a computer, connected to a scanning unit configured to read, as image data, an image on which document data described in a page description language is multiplexed, to
(1) restore the multiplexed document data from the image data read by the scanning unit, and
(2) save (a) the image data read by the reading unit and (b) the restored document data,
wherein in a case that an object included in the document data is an image, the document data obtained by excluding the object is multiplexed on the image data, and
wherein the excluded object is to be printed.

15. An image processing method executed by an information processing apparatus connected to (a) printing unit configured to print an image based on image data and (b) a scanning unit configured to read an image as image data, the method comprising:
generating image data based on document data described in a page description language;
encoding the document data to be multiplexed on the image data;
outputting the image data to the printing unit;
restoring the multiplexed document data from the image data read by the scanning unit; and
saving (a) the image data read by the scanning unit and (b) the restored document data,
wherein in a case that an object included in the document data is an image, the document data obtained by excluding the object is multiplexed on the image data, and
wherein the excluded object is to be printed by the printing unit.

16. An image processing method executed by an information processing apparatus connected to a printing unit configured to print an image based on image data, the method comprising:
generating image data based on document data described in a page description language;
encoding the document data to be multiplexed on the image data; and
outputting the image data to the printing unit,
wherein in a case that an object included in the document data is an image, the document data obtained by excluding the object is multiplexed on the image data, and
wherein the excluded object is to be printed by the printing unit.

17. An image processing method executed by an information processing apparatus connected to a scanning unit configured to read, as image data, an image on which document data described in a page description language is multiplexed, the method comprising:
restoring the multiplexed document data from the image data read by the scanning unit; and
saving (a) the image data read by the scanning unit and (b) the restored document data,
wherein in a case that an object included in the document data is an image, the document data obtained by excluding the object is multiplexed on the image data, and
wherein the excluded object is to be printed.

18. A non-transitory computer-readable medium storing at least one program, wherein the at least one program is configured to cause a computer, connected to (a) a printing unit configured to print an image based on image data and (b) a scanning unit configured to read an image as image data, to
(1) generate image data based on document data described in a page description language,
(2) encode the document data to be multiplexed on the image data,
(3) output the image data to the printing unit,
(4) restore the multiplexed document data from the image data read by the scanning unit, and
(5) save (a) the image data read by the scanning unit and (b) the restored document data,
wherein with respect to each of a plurality of regions obtained by dividing the image data generated from the document data, in a case where there is a region in which a data amount of objects included in the region exceeds a predetermined value, document data obtained by excluding the objects included in the region is multiplexed on the image data.

19. An image processing method executed by an information processing apparatus connected to (a) a printing unit configured to print an image based on image data and (b) a scanning unit configured to read an image as image data, the method comprising:
generating image data based on document data described in a page description language;
encoding the document data to be multiplexed on the image data;
outputting the image data to the printing unit;
restoring the multiplexed document data from the image data read by the scanning unit; and
saving (a) the image data read by the scanning unit and (b) the restored document data,
wherein with respect to each of a plurality of regions obtained by dividing the image data generated from the document data, in a case where there is a region in which a data amount of objects included in the region exceeds a predetermined value, document data obtained by excluding the objects included in the region is multiplexed on the image data.

\* \* \* \* \*